United States Patent
Ishioka

(10) Patent No.: US 11,254,515 B2
(45) Date of Patent: Feb. 22, 2022

(54) CARGO HANDLING APPARATUS

(71) Applicants: KABUSHIKI KAISHA TOSHIBA, Tokyo (JP); Toshiba Infrastructure Systems & Solutions Corporation, Kawasaki (JP)

(72) Inventor: Yukinobu Ishioka, Utsunomiya (JP)

(73) Assignees: KABUSHIKI KAISHA TOSHIBA, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 0 days.

(21) Appl. No.: 17/130,773

(22) Filed: Dec. 22, 2020

(65) Prior Publication Data

US 2021/0107748 A1    Apr. 15, 2021

Related U.S. Application Data

(63) Continuation of application No. PCT/JP2019/027910, filed on Jul. 16, 2019.

(30) Foreign Application Priority Data

Jul. 20, 2018 (JP) .............................. JP2018-137038

(51) Int. Cl.
    *B65G 47/54* (2006.01)
    *B65G 47/32* (2006.01)
    (Continued)

(52) U.S. Cl.
    CPC ............. *B65G 47/54* (2013.01); *B65G 47/32* (2013.01); *B65G 47/57* (2013.01); *B65G 47/91* (2013.01);
    (Continued)

(58) Field of Classification Search
    None
    See application file for complete search history.

(56) References Cited

U.S. PATENT DOCUMENTS

| | | | |
|---|---|---|---|
| 3,013,648 A * | 12/1961 | Kovach | B65G 57/245 414/791.4 |
| 6,457,231 B1 * | 10/2002 | Carter | B23P 21/004 198/370.04 |

(Continued)

FOREIGN PATENT DOCUMENTS

| | | |
|---|---|---|
| JP | 62-16929 A | 1/1987 |
| JP | 6-2528 B2 | 1/1994 |

(Continued)

OTHER PUBLICATIONS

International Search Report dated Oct. 15, 2019 in PCT/JP2019/027910 filed Jul. 16, 2019, AC, AE and AN-AU therein, 2 pages.

*Primary Examiner* — Kavel Singh
(74) *Attorney, Agent, or Firm* — Oblon, McClelland, Maier & Neustadt, L.L.P.

(57) ABSTRACT

A cargo handling apparatus includes a first conveyor portion, a first detection portion, a second conveyor portion, a gripping portion, a second detection portion, and a controller. The first conveyor portion is configured to convey an article to be handled in a first direction. The first detection portion is configured to detect article information. The second conveyor portion is configured to convey the article in a second direction. The gripping portion is configured to arrange the article in an accumulating portion. The second detection portion is configured to detect stacking information. The controller is configured to control operation of the gripping portion based on the article information and the stacking information.

12 Claims, 23 Drawing Sheets

(51) Int. Cl.
     *B65G 47/57*          (2006.01)
     *B65G 47/91*          (2006.01)
     *B65G 61/00*          (2006.01)

(52) U.S. Cl.
     CPC ...... *B65G 61/00* (2013.01); *B65G 2203/0208* (2013.01); *B65G 2207/40* (2013.01)

(56) References Cited

U.S. PATENT DOCUMENTS

| | | |
|---|---|---|
| 6,923,612 B2 | 8/2005 | Hansl |
| 8,118,155 B2 * | 2/2012 | Noda .................... B65G 47/642 |
| | | 198/586 |
| 9,008,825 B2 * | 4/2015 | Benjamin .............. B65G 65/00 |
| | | 700/213 |
| 9,700,927 B2 * | 7/2017 | Krause ................. B21D 43/055 |
| 10,106,340 B2 * | 10/2018 | Gondoh ................. B65G 61/00 |
| 10,351,362 B2 | 7/2019 | Tanaka et al. |
| 2016/0137435 A1 | 5/2016 | Tanaka et al. |
| 2018/0065819 A1 | 3/2018 | Gondoh et al. |

FOREIGN PATENT DOCUMENTS

| | | |
|---|---|---|
| JP | 10-25029 A | 1/1998 |
| JP | 10-151594 A | 6/1998 |
| JP | 2010-58978 A | 3/2010 |
| JP | 2015-174736 A | 10/2015 |
| JP | 2016-94280 A | 5/2016 |
| JP | 2017-214222 A | 12/2017 |
| JP | 2018-39614 A | 3/2018 |
| JP | 2018-43816 A | 3/2018 |
| JP | 2018-79546 A | 5/2018 |

\* cited by examiner

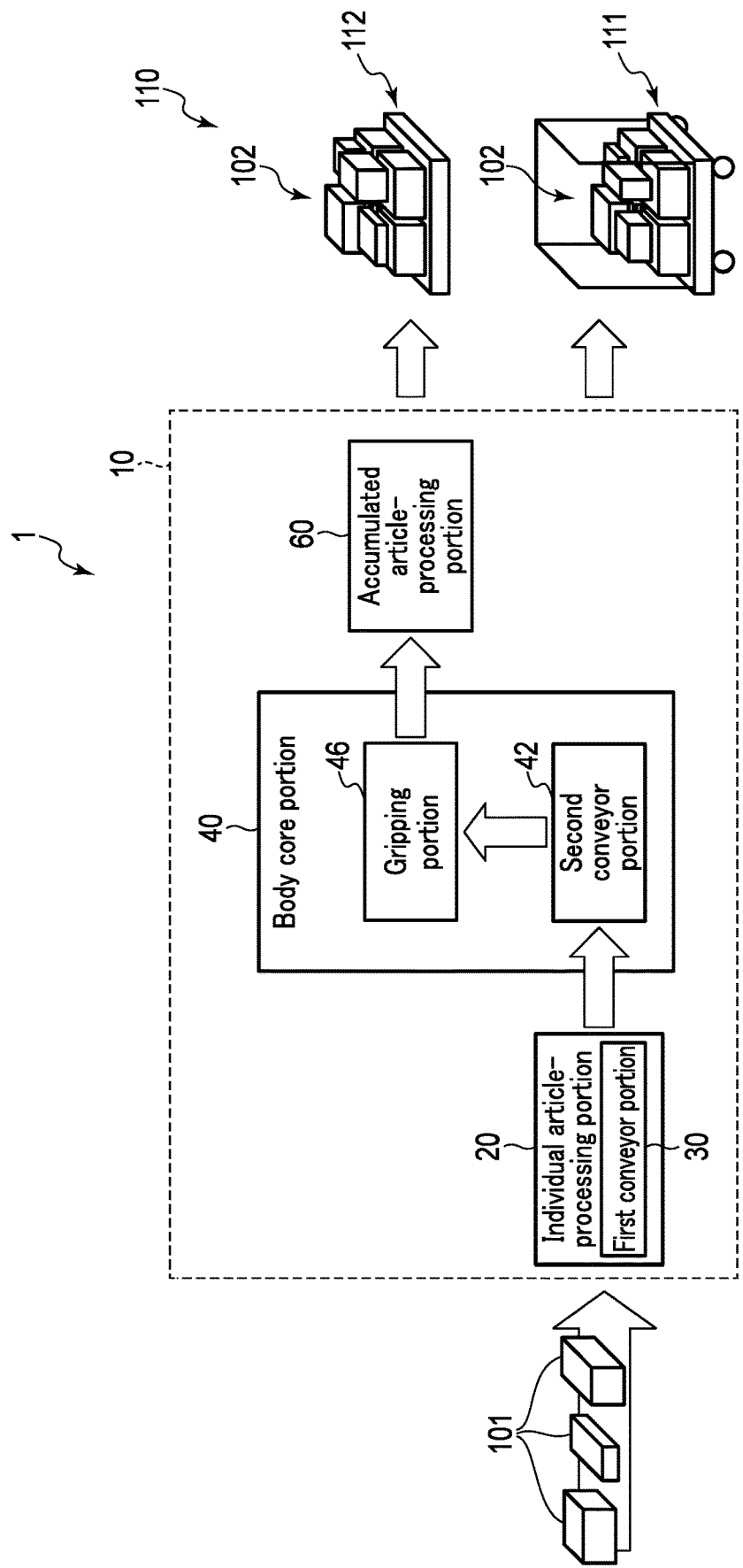
F I G. 2A

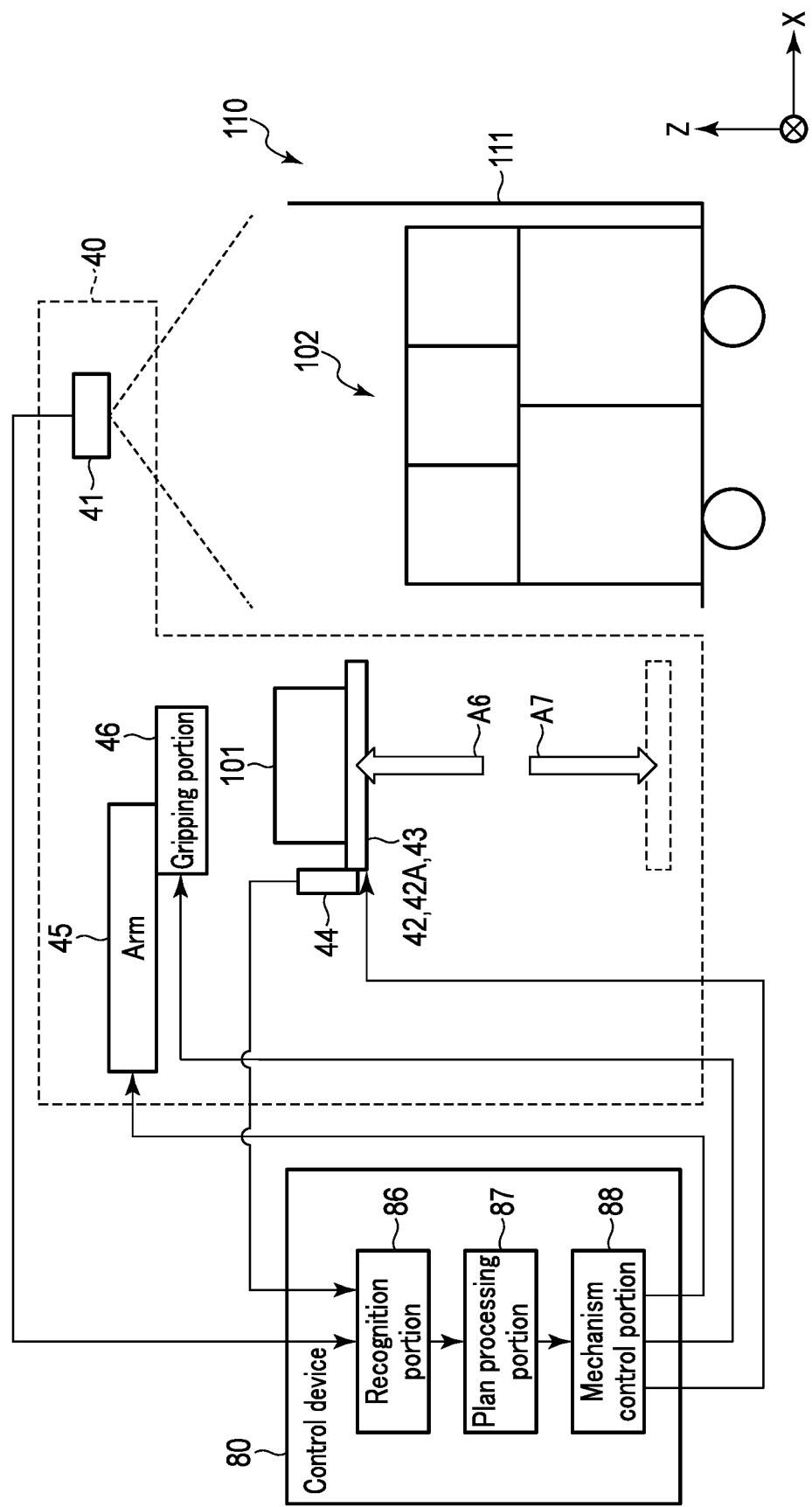
F I G. 6

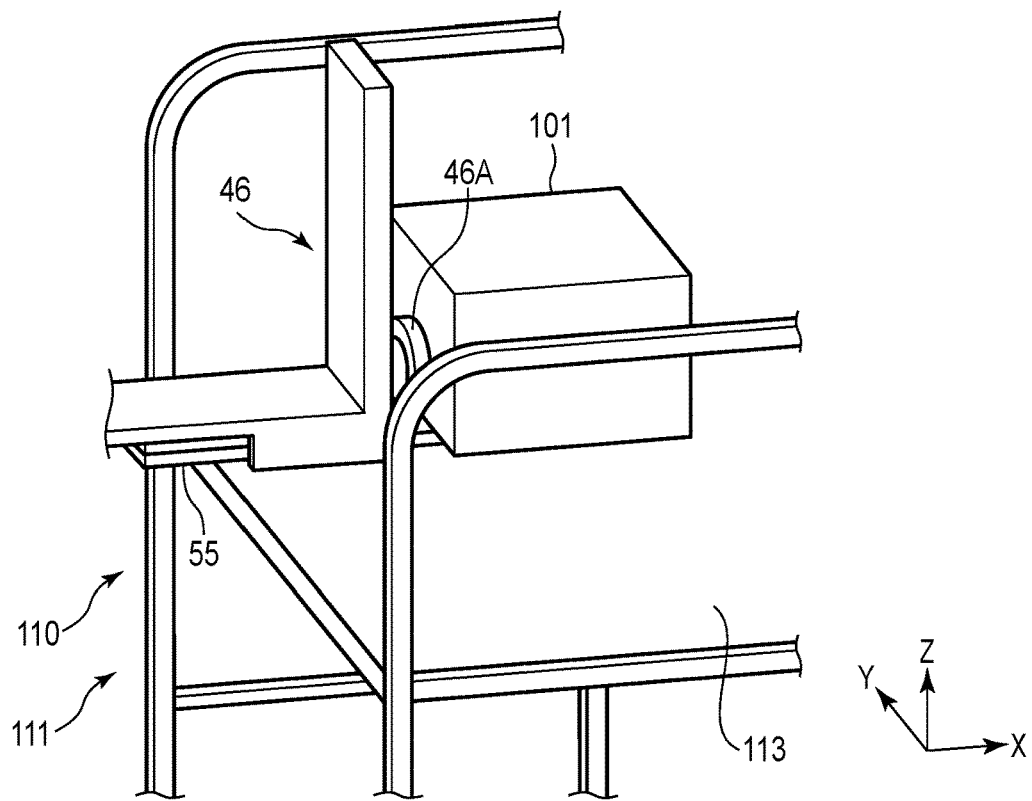
F I G. 9A
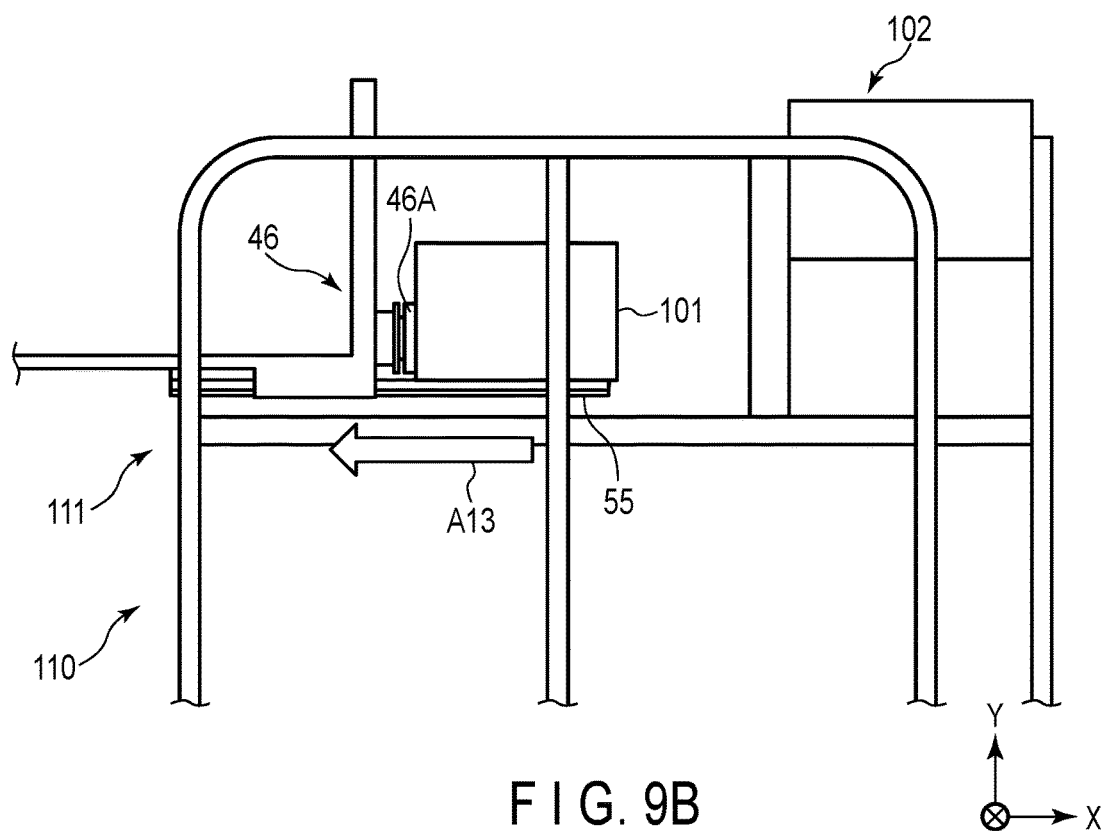
F I G. 9B

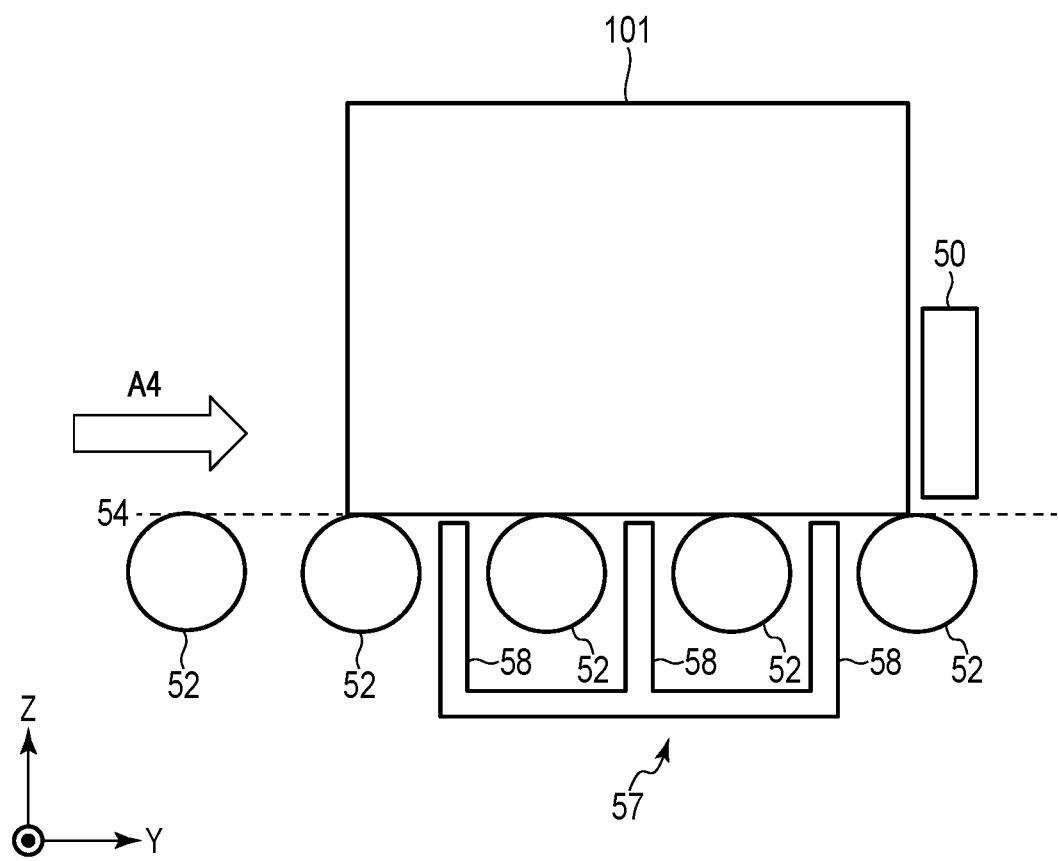
F I G. 10A

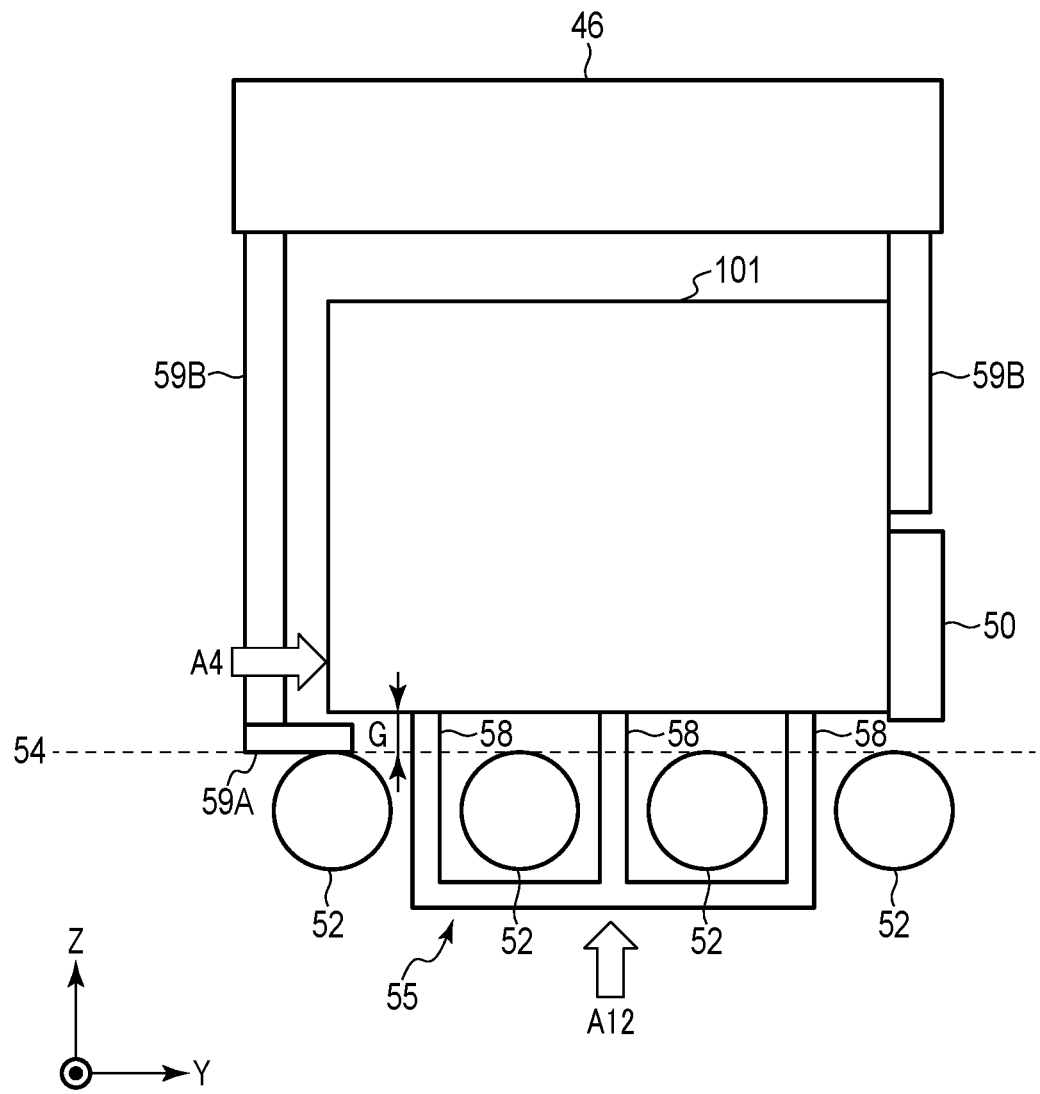
F I G. 10B

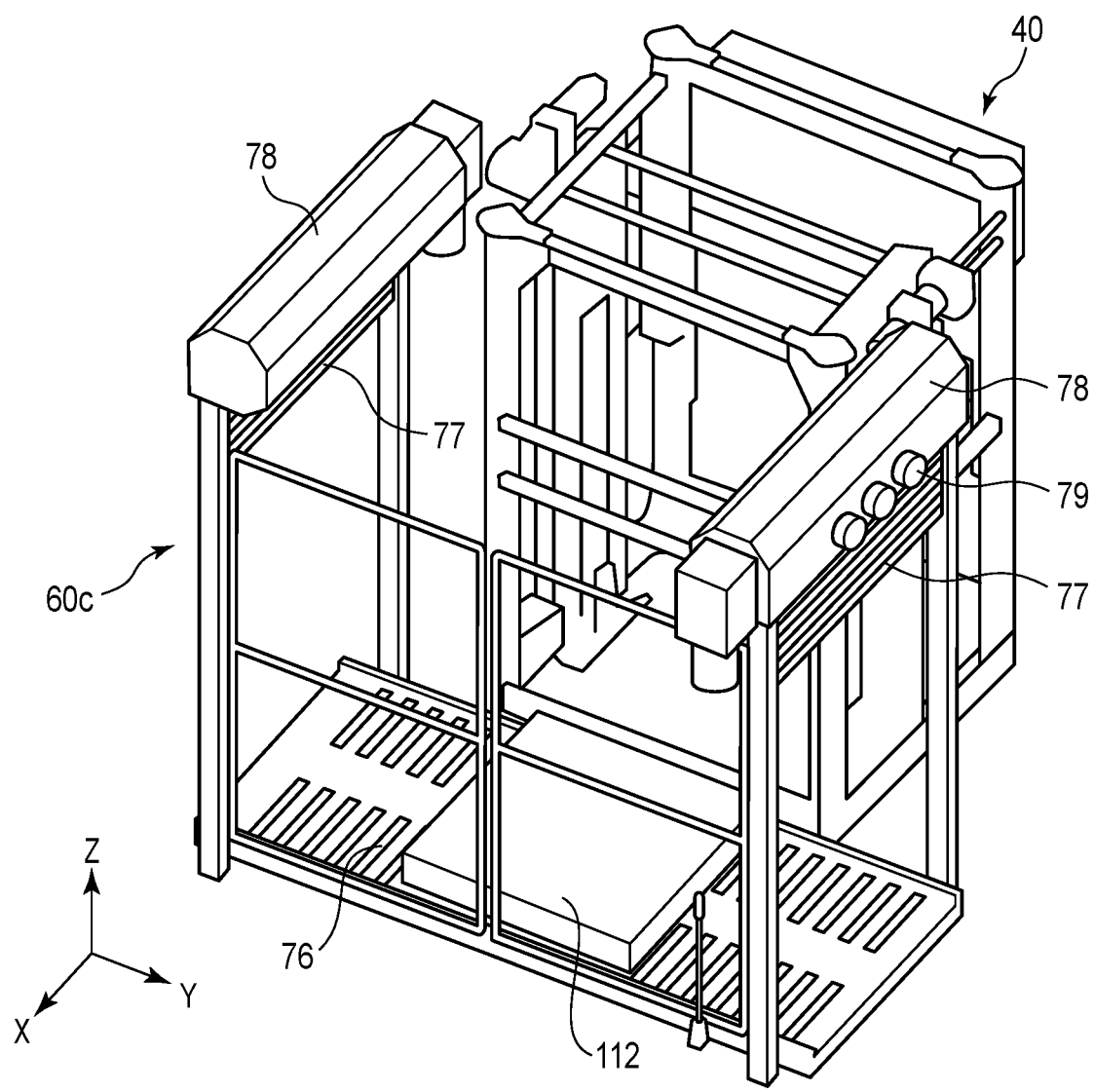
F I G. 18

CARGO HANDLING APPARATUS

CROSS-REFERENCE TO RELATED APPLICATIONS

This application is a Continuation Application of PCT Application No. PCT/JP2019/027910, filed Jul. 16, 2019 and based upon and claiming the benefit of priority from Japanese Patent Application. No. 2018-137038, filed Jul. 20, 2018, the entire contents of all of which are incorporated herein by reference.

FIELD

The present embodiment relates generally to a cargo handling apparatus.

BACKGROUND

Physical distribution sites use various cargo handling apparatuses for handling articles. In this era of increasing cargo in physical distribution, physical distribution sites have a serious shortage of manpower, etc. This requires cargo handling apparatuses to efficiently unload or load various articles having different sizes and weights at a high processing speed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention

FIG. 2A is a diagram schematically illustrating an example in which a cargo handling apparatus is used as a loading apparatus in the cargo handling system.

FIG. 6 is a diagram schematically illustrating an exemplary configuration on the periphery of a body core portion of the cargo handling apparatus.

FIG. 9A is a diagram illustrating an example of operation of loading with the gripping portion.

FIG. 9B is a diagram illustrating an example of operation of loading with the gripping portion.

FIG. 10A is a diagram illustrating an example of operation of gripping an article with the gripping portion.

FIG. 10B is a diagram illustrating an example of operation of gripping an article with the gripping portion.

FIG. 18 is a perspective view illustrating an exemplary configuration on a periphery of the accumulated article-processing portion.

DETAILED DESCRIPTION

According to an embodiment, a cargo handling apparatus includes a first conveyor portion, a first detection portion, a second conveyor portion, a gripping portion, a second detection portion, and a controller. The first conveyor portion is configured to convey an article to be handled in a first direction. The first detection portion is configured to detect article information relating to the article conveyed through the first conveyor portion. The second conveyor portion is configured to receive the article conveyed through the first conveyor portion and convey the article in a second direction intersecting the first direction. The gripping portion is configured to grip the article on the second conveyor portion to move the article in a third direction intersecting the second direction and arrange the article in an accumulating portion. The second detection portion is configured to detect stacking information indicating an arrangement state of articles in the accumulating portion. The controller is configured to control operation of the gripping portion based on the article information and the stacking information.

Embodiments of the present embodiment will be described with reference to the drawings. In the following description, a cargo handling system including an unloading apparatus that is implementable as a loading apparatus configured to perform loading and is also implementable as an unloading apparatus configured to perform unloading will be described.

Figure 1:
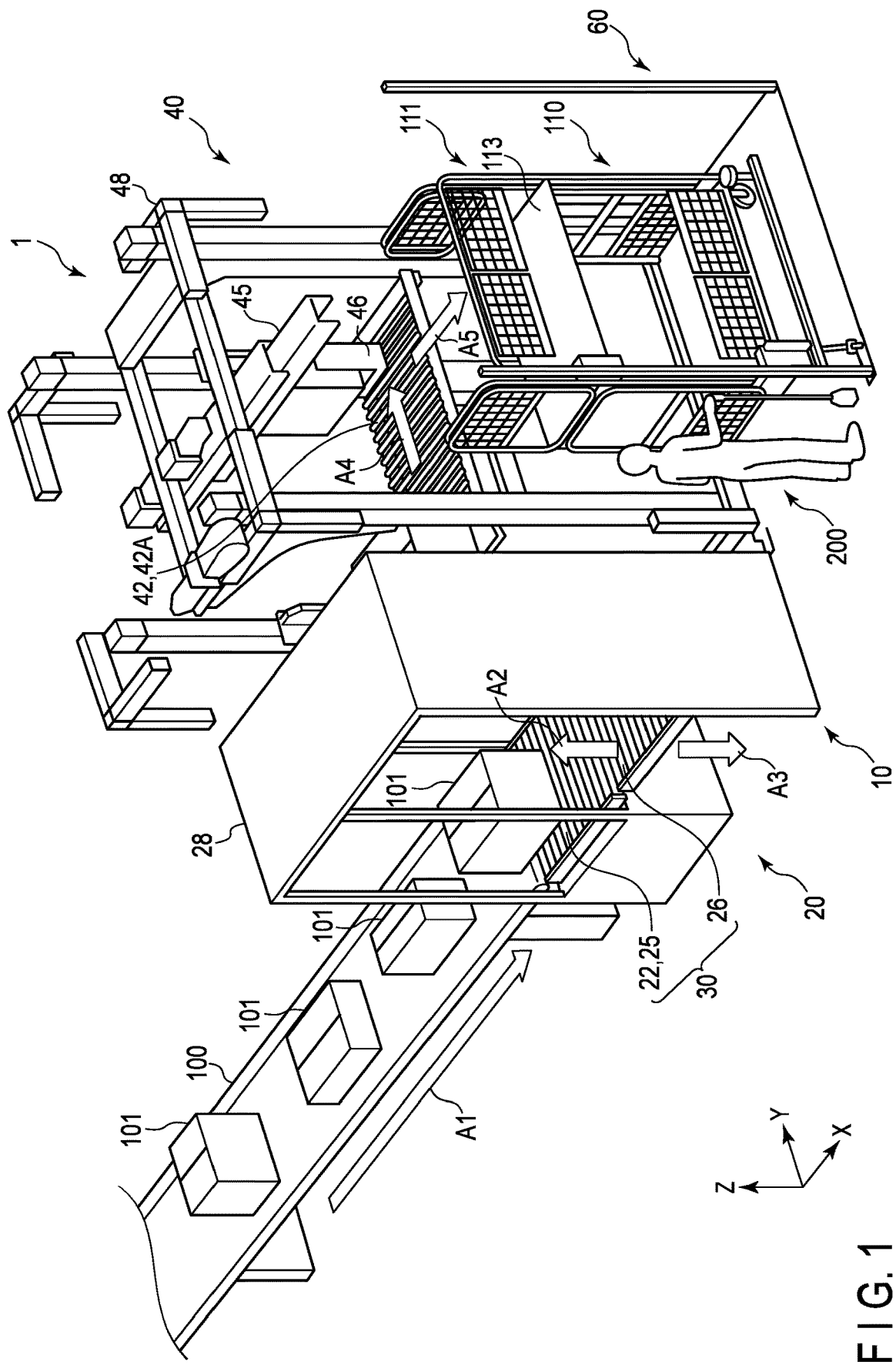
FIG. 1 is a diagram schematically illustrating an example of a cargo handling system.

FIG. 1 is a diagram schematically illustrating an example of a cargo handling system 1 according to the first embodiment. As shown in FIG. 1, an X direction and a Y direction (horizontal direction) and a Z direction (up-down direction or vertical direction) are defined.

The cargo handling system 1 is a system that performs cargo handling and is used in a physical distribution site, etc. Herein, cargo handling refers to loading an article which is one or more packages to be loaded, and unloading an article of an article group including an article which is one or more packages to be unloaded. The article group refers to, for example, a plurality of tiers each having a plurality of articles stacked in a vertical direction (Z direction) with the tiers arranged in a horizontal direction (X direction, Y direction, or both).

The cargo handling system 1 includes a cargo handling apparatus 10. The cargo handling apparatus 10 includes an individual article-processing portion 20, a body core portion 40, an accumulated article-processing portion 60, and a control device 80 (not shown in FIG. 1, see FIG. 3). In FIG. 1, the individual article-processing portion 20, the body core portion 40, and the accumulated article-processing portion 60 are partially omitted. For example, an eaves-like frame covering the entire body core portion 40 and a safety fence surrounding the periphery of the accumulated article-processing portion 60 are not shown in FIG. 1.

Figure 2B:
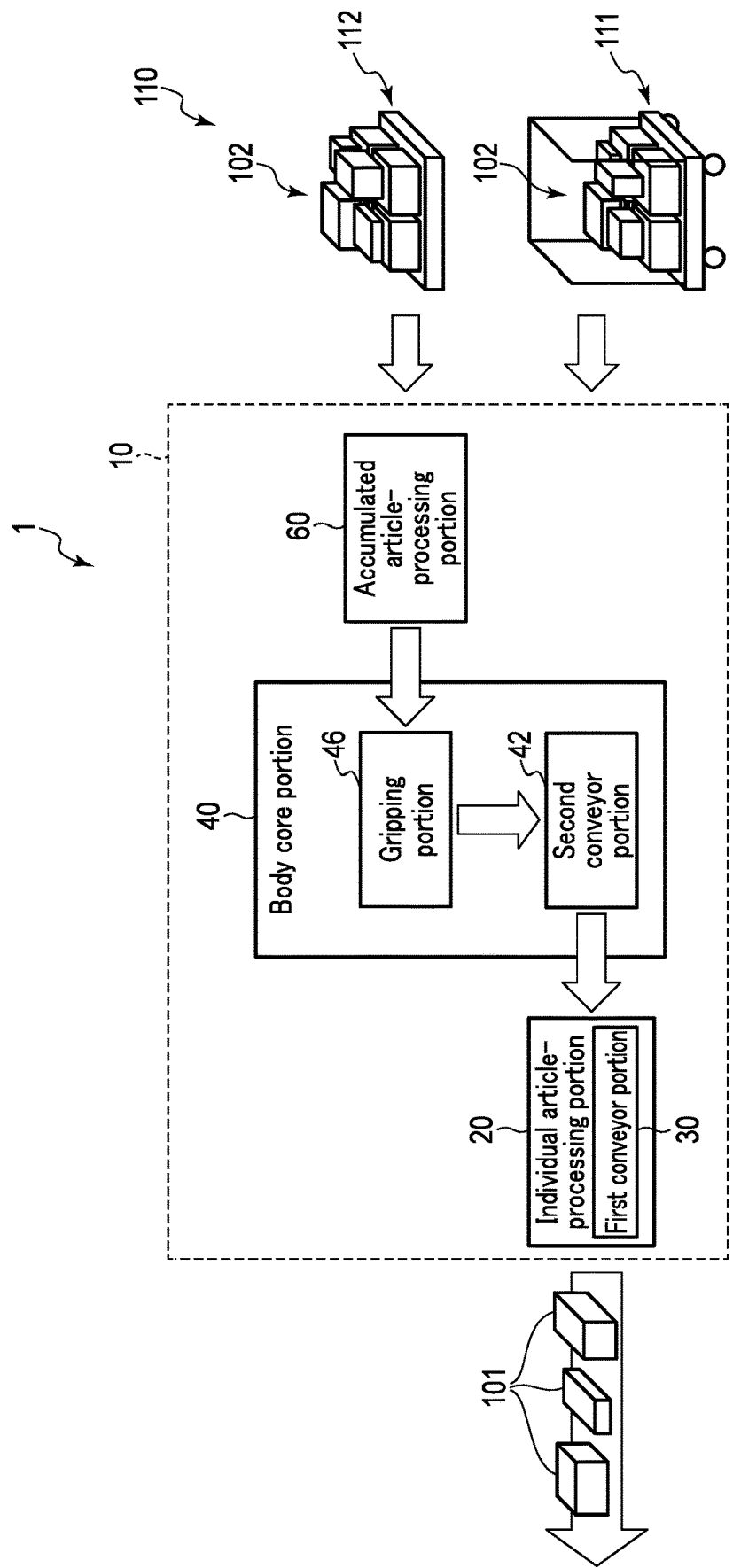
FIG. 2B is a diagram schematically illustrating an example in which the cargo handling apparatus is an unloading apparatus in the cargo handling system.

The cargo handling apparatus 10 is an apparatus capable of both loading and unloading. For example, as shown in FIG. 2A, the cargo handling apparatus 10 is a loading apparatus that loads one or more articles 101 onto an accumulating portion 110 by way of a first conveyor portion 30 of the individual article-processing portion 20, a second conveyor portion 42 and a gripping portion 46 of the body core portion 40, and the accumulated article-processing portion 60. In addition, for example, as illustrated in FIG. 2B, the cargo handling apparatus 10 is an unloading apparatus that unloads an article group 102 placed on the accumulating portion 110 by way of the accumulated article-processing portion 60, the gripping portion 46 and the second conveyor portion 42 of the body core portion 40, and the first conveyor portion 30 of the individual article-processing portion 20. The articles 101 to be loaded or unloaded may vary in size, weight, orientation, etc.

The accumulating portion 110 is, for example, an accumulation table. The accumulating portion 110 may be movable and be a roll box pallet (RBP) 111, a flat pallet 112, a balance truck, or the like, which accommodates the article group 102. The RBP 111 is a basket-like pallet with casters, and is also referred to as a basket cart. The RBP 111 may have an intermediate shelf 113 as shown in FIG. 1. The accumulating portion 110 is installed in the accumulated article-processing portion 60 by an operator 200.

As shown in FIG. 1, as a loading apparatus, the cargo handling apparatus 10 captures the articles 101, which are conveyed from the conveyor 100, one by one and takes them into the individual article-processing portion 20, and loads the articles 101 onto the accumulating portion 110 by way of the body core portion 40 and the accumulated article-processing portion 60. Each of the articles 101 is conveyed through the conveyor 100 and the individual article-processing portion 20 in the X direction indicated by arrow A1 and is then lifted in the Z direction indicated by arrow A2, for example. Thereafter, the article 101 is conveyed through the individual article-processing portion 20 and the body core portion 40 in the Y direction indicated by arrow A4, and is further transported through the body core portion 40 in the X direction indicated by arrow A5, thereby being loaded onto the accumulating portion 110 of the accumulated article-processing portion 60.

Hereinafter, unless otherwise specified, the cargo handling system 1 will be described by taking as an example a case in which the cargo handling apparatus 10 is used as a loading apparatus.

The conveyor 100 is a conveyor that is not included in the cargo handling apparatus 10 and transports the articles 101 to be loaded in the X direction. The conveyor 100 may be a general belt conveyor, roller conveyor, etc., and is unique depending on a use environment or an operation condition. Herein, the use environment indicates the arrangement of the accumulating portion 110 with respect to the conveyor 100, the access direction to the accumulating portion 110, the type of the accumulating portion 110 (the RBP 111, the flat pallet 112, a balance truck, etc.), and so on. The operation condition indicates the type of article to handle, the type of package (for example, cardboard) of the article 101, an access object (manpower, a fork lift, a dedicated transport lane, etc.) to the accumulating portion 110, and so on. The cargo handling apparatus 10 is installed at the end of the conveyor 100 with almost no change in the use environment. Even when articles 101 in irregular shapes having different sizes and weights randomly flow on the conveyor 100, the cargo handling apparatus 10 loads these articles 101 onto the accumulating portion 110 through processing to be described later.

Figure 3:
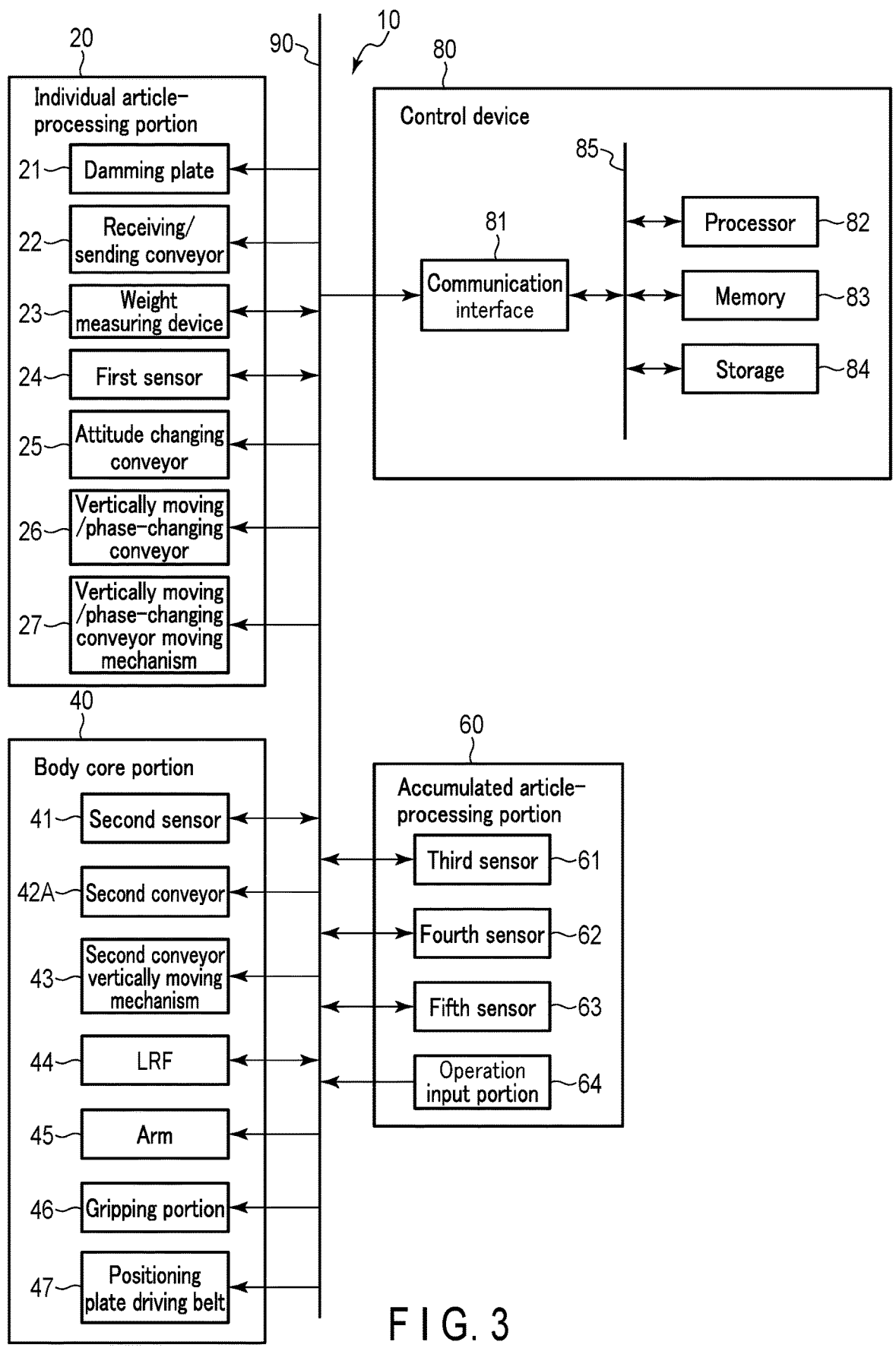
FIG. 3 is a block diagram illustrating one exemplary configuration of a configuration of the cargo handling apparatus.

FIG. 3 is a block diagram illustrating an example of a configuration of the cargo handling apparatus 10. The control device 80 includes a communication interface 81, a processor 82, a memory 83, and a storage 84. They are communicable via a bus 85.

The communication interface 81 is an interface used for communication with an external device. The communication interface 81 has a terminal and a circuit that are compatible with, e.g., communication standards for communications with each device in the individual article-processing portion 20, the body core portion 40, and the accumulated article-processing portion 60. The communication interface 81 communicates with each device in the individual article-processing portion 20, the body core portion 40, and the accumulated article-processing portion 60 through a network 90 under the control of the processor 82.

The processor 82 is constituted by a central processing unit (CPU), for example. The memory 83 includes a read only memory (ROM) which is a read-only data memory or a random access memory (RAM) which temporarily stores data. The storage 84 may be a large-capacity storage such as a hard disk drive (HDD) or a solid state drive (SSD). The memory 83 or the storage 84 stores a control program or various types of data for each device in the cargo handling apparatus 10. The processor 82 performs various types of processing based on a program, etc., stored in the memory 83 or the storage 84. That is, the processor 82 executes various programs, as a software function portion. Instead of the processor 82, a control circuit such as an application specific integrated circuit (ASIC) or a field programmable gate array (FPGA), which is a hardware functional portion, may be used.

The present embodiment is described based on the assumption that a single control device 80 controls each device in the cargo handling apparatus 10; however, the number of control devices 80 is not limited to one. A plurality of control devices that are mutually communicable may control respective devices.

The control device 80 may include an operation terminal. An operation input portion 64 of the accumulated-article processing portion 60 shown in FIG. 3 is an example of the operation terminal that receives an input to the control device 80. The operation terminal may be, for example, a touch panel used for screen display and instruction input to the control device 80, or a display device such as a display and an input device such as a keyboard.

Figure 4:
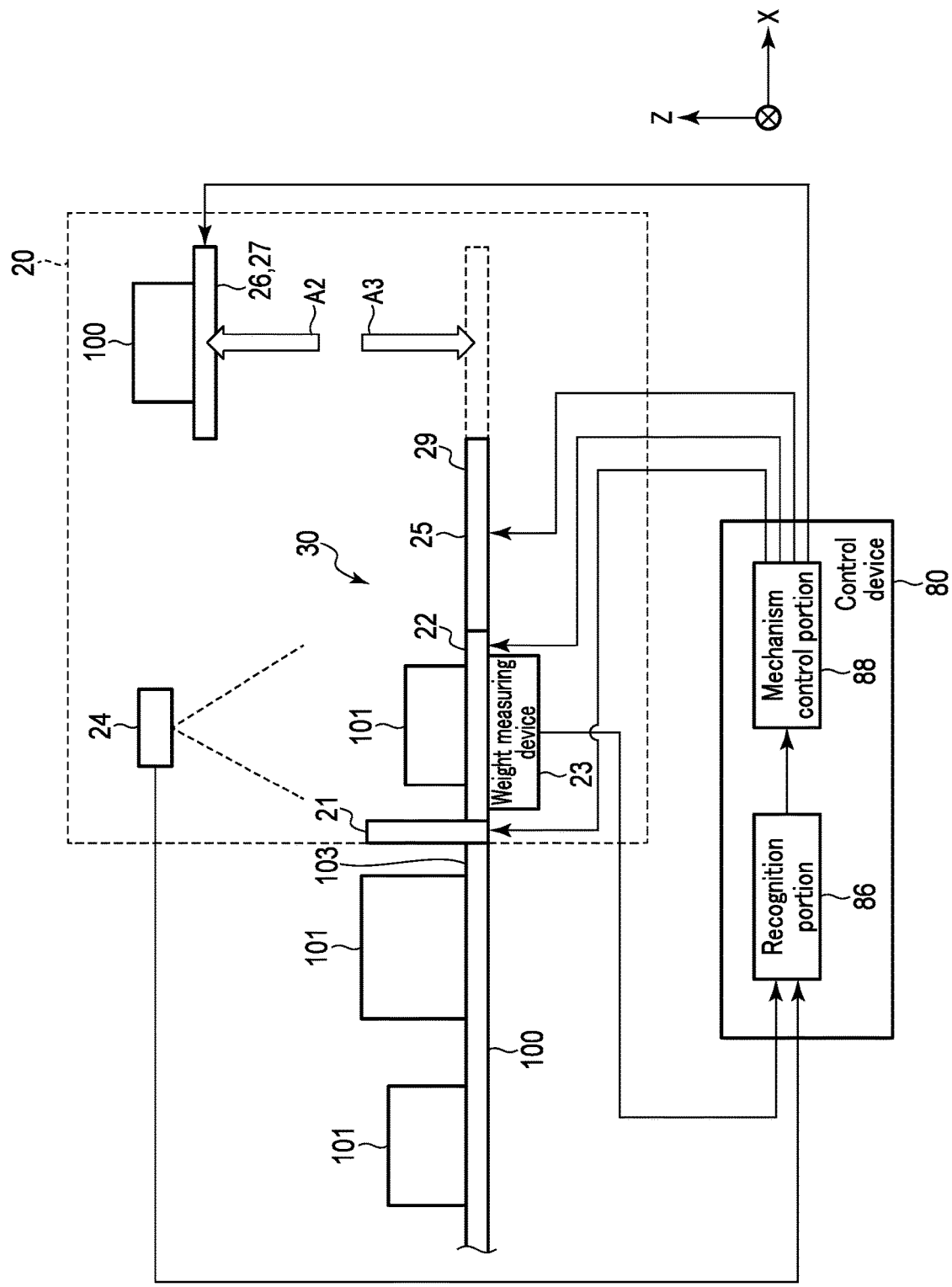
FIG. 4 is a diagram schematically illustrating an exemplary configuration on a periphery of an individual article-processing portion of the cargo handling apparatus according to a first embodiment.

The individual article-processing portion 20 will be described with reference to FIGS. 3 to 5. In the following description, the term "downstream" is used with respect to the flow direction of the articles 101 in the cargo handling system 1 (see FIG. 2A) in a case where the cargo handling apparatus 10 is used as a loading apparatus.

The individual article-processing portion 20 is arranged downstream of the conveyor 100 in such a manner as to be adjacent to conveyor 100. The individual article-processing portion 20 captures, for example, the articles 101 flowing in the X direction, from the conveyor 100. The individual article-processing portion 20 receives the articles 101 and corresponds to a pre-stage processing portion.

The individual article-processing portion 20 includes a damming plate 21, a receiving/sending conveyor 22, a weight measuring device 23, a first sensor 24, an attitude changing conveyor 25, a vertically moving/phase-changing conveyor 26, and a vertically moving/phase-changing conveyor moving mechanism 27. They are housed in, for example, a housing 28. The operation of each of them is controlled by the control device 80. Here, as shown in FIG. 4, the control device 80 includes a recognition portion 86 and a mechanism control portion 88. Each of the receiving/sending conveyor 22, the attitude changing conveyor 25, and the vertically moving/phase-changing conveyor 26 is a conveying mechanism corresponding to the first conveyor portion 30 shown in FIGS. 1, 2A and 2B.

The damming plate 21 is arranged adjacent to the end of the conveyor 100. The damming plate 21 includes a driving mechanism (not shown). The damming plate 21 is capable of moving in the Z direction by the driving mechanism being controlled by the mechanism control portion 88. That is, the damming plate 21 is movable. The damming plate 21 moves up and down, thereby restricting the capture of the articles 101 from the conveyor 100 and taking them into the individual article-processing portion 20.

If the damming plate 21 protrudes from a conveyor face 103 of the conveyor 100 in the Z direction, the article 101 is not captured and taken into the individual article-processing portion 20 from the conveyor 100. If the damming plate 21 is retracted below the level of the conveyor face 103, the article 101 is captured and taken into the individual article-processing portion 20 from the conveyor 100. By the mechanism control portion 88 moving the damming plate 21 up and down at a desired timing, the articles 101 are captured one by one from the conveyor 100 and taken into the individual article-processing portion 20. In order to operate the damming plate 21 at a desired timing, a sensor (not shown) may be provided to detect the completion of capture and taking of one article 101 into the individual article processing portion 20. The mechanism control portion 88 may move the damming plate 21 up and down based on the information detected by the aforementioned sensor.

The receiving/sending conveyor 22 serves as a receiving conveyor that receives the articles 101 from the conveyor 100 in a case of using the cargo handling apparatus 10 as a loading apparatus, and serves as a sending conveyor that sends the articles 101 to the conveyor 100 in a case of using the cargo handling apparatus 10 as an unloading apparatus.

Since loading will be described hereinafter, the receiving/sending conveyor 22 will be referred to as a receiving conveyor 22.

The receiving conveyor 22 is arranged downstream of the damming plate 21. The receiving conveyor 22 is a conveyor in which the article 101 conveyed through the conveyor 100 arrives first in the individual article-processing portion 20. The conveyance operation of the receiving conveyor 22 is controlled by the mechanism control portion 88. The receiving conveyor 22 captures the articles 101 from the conveyor 100 and transfers them to the attitude changing conveyor 25 located downstream.

The receiving conveyor 22 is provided with a weight measuring device 23. The weight measuring device 23 is controlled by the mechanism control portion 88. The weight measuring device 23 measures the weight of the article 101 on the receiving conveyor 22. Information on the measured weight is acquired by the recognition portion 86.

A first conveyor 24 is arranged above the receiving sensor 22. The first sensor 24 is, for example, a camera. The first sensor 24 detects the article 101 on the receiving conveyor 22. The first sensor 24 is not limited to a camera (area sensor) arranged above the receiving conveyor 22. For example, a line sensor that has imaging elements arranged linearly in the Z direction and images the articles 101 flowing into the receiving conveyor 22 may be provided. The detection information by the first sensor 24 is acquired by the recognition portion 86. Based on this detection information, the size of the article 101 is calculated by the recognition portion 86.

For example, the receiving conveyor 22 may be a measuring and weighing conveyor that is configured integrally with the weight measuring device 23 and the first sensor 24 and is capable of detecting and weighing an article on the conveyor.

The attitude changing conveyor 25 is arranged downstream of the receiving conveyor 22. As shown in FIG. 5, the attitude changing conveyor 25 has a function of performing vertical/horizontal conversion of the article 101, for example, changing the orientation of the article 101 in the X direction and the Y direction by 90°. That is, the attitude changing conveyor 25 is a conveyor having a mechanism for changing the attitude of the article 101. The attitude changing conveyor 25 changes the attitude of the article 101 by a vertical/horizontal conversion mechanism (not shown), for example, a turntable.

Figure 5:
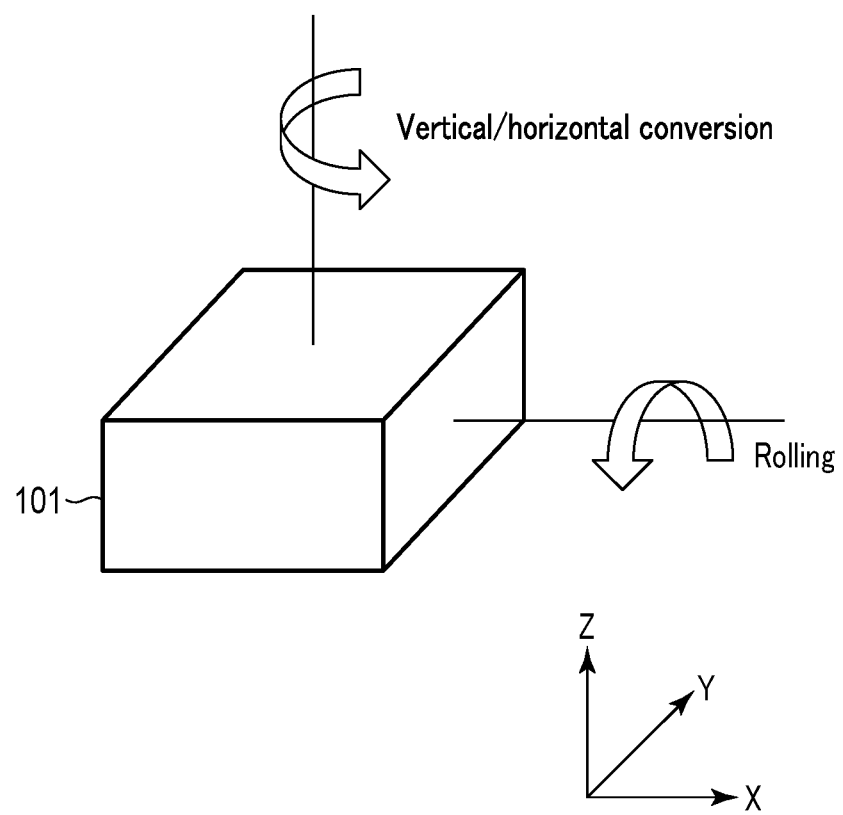
FIG. 5 is a diagram illustrating vertical/horizontal conversion and rolling of an article.

Alternatively, as shown in FIG. 5, the attitude changing conveyor 25 may have a function of performing rolling or top/bottom conversion of the article 101, for example, changing which face of the article 101 is in contact with the conveyor face 29 of the attitude changing conveyor 25. The attitude changing conveyor 25 changes the attitude of the article 101 using a rolling mechanism (not shown), for example, a mechanism for inclining the conveyor face 29. For example, a fallen article can be raised back up again.

As described above, the attitude changing conveyor 25 is a conveyor including an attitude changing portion that changes the attitude of the article 101 in the individual article-processing portion 20, by, for example, performing vertical/horizontal conversion, top/bottom conversion, etc. on the article 101.

For example, the mechanism control portion 88 controls the operation of the attitude changing conveyor 25 based on the size information calculated by the recognition portion 86. The recognition portion 86 may calculate the size information based on the detection information from the first sensor 24. The conveyance operation of the attitude changing conveyor 25 is controlled by the mechanism control portion 88. The attitude changing conveyor 25 conveys in the X direction corresponding to the first direction, the article 101 flowing from the receiving conveyor 22, and transfers it to the vertically moving/phase-changing conveyor 26 located downstream.

In the cargo handling apparatus 10 shown in FIG. 1, the receiving conveyor 22 and the attitude changing conveyor 25 are integrated into one conveyor for simplicity. In practice also, the attitude changing conveyor 25 may be omitted and the receiving conveyor 22 may transfer the article 101 to the vertically moving/phase-changing conveyor 26 located downstream.

The vertically moving/phase-changing conveyor 26 is arranged downstream of the attitude changing conveyor 25. The vertically moving/phase-changing conveyor 26 is provided with the vertically moving/phase-changing conveyor moving mechanism 27. Hereinafter, the vertically moving/phase-changing conveyor moving mechanism 27 will be simply referred to as a conveyor moving mechanism 27.

The vertically moving/phase-changing conveyor 26 can change the phase by, for example, 90° by the operation of the conveyor moving mechanism 27 being controlled by the mechanism control portion 88. That is, the vertically moving/phase-changing conveyor 26 is a direction-changing conveyor capable of switching the conveyance direction between the X direction and the Y direction. The vertically moving/phase-changing conveyor 26 receives the article 101 flowing from the attitude changing conveyor 25, changes the conveyance direction, and transfers the article 101 to the second conveyor portion 42 of the body core portion 40. The phase of the vertically moving/phase-changing conveyor 26, which is changed by the conveyor moving mechanism 27, is not limited to 90°. The vertically moving/phase-changing conveyor 26 only needs to reverse the conveyance direction so that the second conveyor portion 42 can receive the article 101. Furthermore, the vertically moving/phase-changing conveyor 26 is a vertically moving conveyor that is movable in an upward direction or a downward direction indicated by arrow A2 or A3 in FIG. 4, that is, is capable of vertically moving, by the operation of the conveyor moving mechanism 27 being controlled by the mechanism control portion 88. The conveyance operation of the vertically moving/phase-changing conveyor 26 is controlled by the mechanism control portion 88.

As described above, the vertically moving/phase-changing conveyor 26 is a transfer conveyor configured to transfer the articles 101 to the second conveyor portion 42 of the body core portion 40 in the loading apparatus. The vertically moving/phase-changing conveyor 26 serving as the transfer conveyor includes the conveyor moving mechanism 27 which is a transfer conveyor-vertically moving mechanism for vertically moving the vertically moving/phase-changing conveyor 26 to adjust its level with the level of the second conveyor portion 42.

The receiving conveyor 22, the attitude changing conveyor 25, and the vertically moving/phase-changing conveyor 26 of the individual article processing conveyor 20 are arranged, for example, in line with the conveyor 100. As described above, by changing the phase, the vertically moving/phase-changing conveyor 26 can make its conveyance direction different from those of the conveyor 100, the receiving conveyor 22, and the attitude changing conveyor 25, for example, can set the conveyance direction to the Y direction substantially orthogonal to the X direction.

In a case where the cargo handling apparatus 10 is used as an unloading apparatus, the individual article-processing portion 20 serves as a latter-stage processing portion for the article 101 unloaded from the accumulating portion 110. In a case of functioning as the latter-stage processing portion, the individual article-processing portion 20 can align the articles 101 in terms of orientation, attitude, upper and lower faces, etc., with respect to the conveyor 100 to which the individual article-processing portion 20 feeds the articles 101 under the control of the control device 80. For example, the individual article-processing portion 20 can change the orientation of an article 101 based on a label or a code displayed on the article 101, or cause to fall sideways an article 101 having an aspect ratio with which the article 101 is likely to fall. Furthermore, for example, by controlling the operation of the damming plate 21 at a desired timing, it is also possible to feed articles with a discretionary space therebetween.

The body core portion 40 will be described with reference to FIGS. 3 and 6.

The body core portion 40 is arranged downstream of the individual article-processing portion 20 in such a manner as to be adjacent to the individual article-processing portion 20. The body core portion 40 loads the article 101, which is conveyed from the individual article-processing portion 20, onto the accumulating portion 110 installed in the accumulated article-processing portion 60. As shown in FIG. 3, the body core portion 40 includes a second sensor 41, a second conveyor 42A of the second conveyor portion 42, a second conveyor-vertically moving mechanism 43, a laser range finder (LRF) 44, an arm 45, the gripping portion 46, and a positioning plate driving belt 47. Except for the second sensor 41, they are attached, for example, to the inside of the body frame 48 shown in FIG. 1. The operation of each of them is controlled by the control device 80. Herein, the control device 80 includes the recognition portion 86, a plan processing portion 87, and a mechanism control portion 88, as shown in FIG. 6.

As shown in FIG. 6, the second sensor 41 is arranged above the accumulating portion 110 which corresponds to the RBP 111, for example. In the present embodiment, the second sensor 41 is a part of the body core portion 40; however, depending on the arrangement, the second sensor 41 may be a part of the accumulated article-processing portion 60. The second sensor 41 is, for example, a camera. The second sensor 41 detects the article group 102 in the accumulating portion 110 arranged in the accumulated article-processing portion 60. The detection information on the article group 102 by the second sensor 41 is acquired by the recognition portion 86. Based on this detection information, the recognition portion 86 recognizes information indicative of the arrangement state of articles in the accumulating portion 110, such as the arrangement of articles inside the accumulating portion 110, the size of a space in which the articles can be stacked, and the like, as stacking information.

The second conveyor 42A is a conveying mechanism of the body core portion 40, and is a conveyor on which the article 101 sent from the vertically moving/phase-changing conveyor 26 of the individual article-processing portion 20 arrives. The second conveyor 42A is provided with the second conveyor-vertically moving mechanism 43. The second conveyor 42A includes the second conveyor-vertically moving portion 43 that lifts and lowers the second conveyor 42A of the second conveyor portion 42 in order to adjust the level of the second conveyor 42A of the second conveyor portion 42 to the level that is reached when the article 101 is arranged in the accumulating portion 110. The second conveyor 42A is movable in an upward direction or a downward direction indicated by arrows A6 or A7 in FTC. 6 by the operation of the second conveyor-vertically moving mechanism 43 being controlled by the mechanism control portion 88. The conveyance operation of the second conveyor 42A is controlled by the mechanism control portion 88. The second conveyor 42A receives the article 101 flowing from the vertically moving/phase-changing conveyor 26.

As shown in FIG. 1, the conveyance direction A4 of the articles 101 in the second conveyor 42A of the body core portion 40 is, for example, the Y direction (second direction). On the other hand, the conveyor direction A1 of the conveyor 100 and the individual article-processing portion 20 is, for example, the X direction (first direction). That is, the second conveyor 42A is arranged in such a manner as to be substantially orthogonal to the conveyor 100, the receiving conveyor 22, and the attitude changing conveyor 25, thereby resulting in the conveyance direction of the second conveyor 42A being substantially orthogonal to the conveyance direction of the conveyor 100 and the individual article-processing portion 20.

The LRF 44 is provided in such a manner as to vertically move along with the vertical movement of the second conveyor 42A. The LRF 44 may be attached to the second conveyor 42A, for example. When the second conveyor 42A is vertically moved by the second conveyor-vertically moving mechanism 43, the LRF 44 is vertically moved together with the second conveyor 42A. The LRF 44 causes, for example, a semiconductor laser to emit laser light, thereby measuring a distance to the article group 102 inside the accumulating portion 110. Information on the measured distance is acquired by the recognition portion 86. Based on this distance information, the recognition portion 86 recognizes as stacking information the arrangement of articles inside the accumulating portion 110, the size of a space in which the articles can be stacked, and the like. Meanwhile, the information acquired from the LRF 44 is to supplement the information acquired from the second sensor 41, for example.

The arm 45 is attached to the body frame 48. As shown in FIG. 1, the arm 45 is a movable member extending in the X direction. The arm 45 includes a three-dimensional movement mechanism, and is movable independently in each of the X direction, the Y direction, and the Z direction. The operation of the arm 45 is controlled by the mechanism control portion 88. For example, the operation of the arm 45 is controlled by the mechanism control portion 88 based on the arrangement information that the plan processing portion 87 has determined from the stacking information acquired by the recognition portion 86 from the second sensor 41 and the LRF 44.

The arm 45 is an orthogonal-type arm mechanism, unlike a vertical articulated robot widely used for industrial purposes. The arm 45 is, for example, a non-articulated member extending in the X direction orthogonal to the Y direction, which is the conveyance direction of the second conveyor 42A, for example. The arm 45 can access the accumulating portion 110 in the horizontal direction, for example, and load articles below the intermediate shelf 113 of the RBP 111 having the intermediate shelf 113 as shown in FIG. 1.

The gripping portion 46 is provided on the distal end of the arm 45. The gripping portion 46 moves as the arm 45 moves in each of the X direction, the Y direction, and the Z direction. The gripping portion 46 grips the article 101 on the second conveyor 42A of the second conveyor portion 42. The gripping portion 46 may include, for example, a suction portion 46A (see FIG. 7) configured to vacuum-suck the article 101 or a gripper configured to grip the article 101 by nipping it. Herein, the term "grip" indicates holding the article 101 in a movable manner by supporting at least one of, for example, the side faces, the bottom face, and the upper face of the article 101. The gripping operation of the gripping portion 46 is controlled by the mechanism control portion 88. As will be described later, the gripping portion 46 includes a comb-tooth shaped member configured to scoop up the article 101 on the second conveyor 42A, for example a fork 55 configured to scoop up the article 101 from its bottom face in contact with the second conveyor 42A and grip it.

The basic direction in which the gripping portion 46 accesses the accumulating portion 110 is the X direction (third direction). The basic direction is substantially orthogonal to the conveyance direction (Y direction) of the second conveyor 42A on which the article 101 which is a grip target of the gripping portion 46 is placed.

The operation speed of the arm 45 and the gripping portion 46 may be determined based on the weight of the article 101 measured by the weight measuring device 23. The plan processing portion 87 determines the operation speed of the arm 45 and the gripping portion 46 in accordance with the weight of the article 101 to be gripped with the gripping portion 46. For example, in a case of gripping a relatively heavy article 101, the arm 45 and the gripping portion 46 are operated at a relatively slow speed. In a case of gripping a relatively light article 101, the arm 45 and the gripping portion 46 are operated at a relatively high speed.

An exemplary configuration on the periphery of the second conveyor portion 42 of the body core portion 40 will be described with reference to FIG. 7. In the body core portion 40, the second conveyor 42A, the positioning plate driving belt 47, a positioning plate 50, and a flap plate 51 are attached to a conveyor frame 49. The second conveyor 42A is a conveyor that receives the article 101 conveyed from the vertically moving/phase-changing conveyor 26 of the individual article-processing portion 20 and conveys the received article 101 in, for example, the Y direction. The second conveyor 42A is, for example, a roller conveyor, and includes a plurality of rollers 52 each extending in the X direction and arranged at predetermined intervals in the Y direction. Each of the rollers 52 has both ends rotatably attached to a frame end 53.

The positioning plate driving belt 47 is, for example, an endless belt having a length corresponding to a length of the second conveyor 42A. The positioning plate driving belt 47 is attached to each of the frame ends 53 in the Y direction as the longitudinal direction of the conveyor frame 49 in such a manner that the positioning plate driving belt 47 extends in the Y direction. The positioning plate driving belt 47 includes a driving mechanism such as a motor, and the operation of the driving mechanism is controlled by the mechanism control portion 88. The positioning plate driving belt 47 is driven to rotate under the control of the mechanism control portion 88.

The positioning plate 50 is a flat plate standing upright in the Z direction. The positioning plate 50 is arranged on the second conveyor 42A. The longitudinal axis of the positioning plate 50 extends in the X direction. The positioning plate 50 has a predetermined thickness in the Y direction and a predetermined height in the Z direction. Both ends of the positioning plate 50 are respectively attached to the positioning plate driving belts 47. The positioning plate 50 is movable in directions indicated by arrows A8 and A9 in FIG. 7 by driving the positioning plate driving belts 47. The positioning plate 50 is a member for positioning the article 101 to be gripped with the gripping portion 46, at a position suitable for gripping. That is, the positioning plate 50 is provided in order to load articles using the gripping portion 46 after the articles are aligned in terms of attitude. The position of the positioning plate 50 may be determined based on information on a size of the article 101 on the second conveyor 42A, acquired from the first sensor 24 of the individual article-processing portion 20.

The positioning plate 50 and the positioning plate driving belts 47 constitute a positioning mechanism 47A that adjusts the position of the article 101 conveyed through the second conveyor 42A of the second conveyor portion 42 in the conveyance direction of the second conveyor 42A. In other words, the positioning mechanism 47A adjusts the position of the articles 101 on the conveyor 42A of the second conveyor portion 42, for example, in the directions indicated by arrows A8 and A9 in FIG. 7 (the conveyor direction, for example the second direction described later, in which the second conveyor 42A conveys the articles 101).

The flap plate 51 is attached to the frame end 53 (the frame end 53 on the side close to the accumulating portion 110) of the conveyor frame 49 in the Y direction. The flap plate 51 is a plate that pivotally turns on the frame end 53. Normally, the flap plate 51 stands upright in the Z direction by means of a spring. The force of the spring prevents the flap plate 51 from falling due to conveyance of the article 101 with the second conveyor 42A. When the suction portion 46A (for example, a vacuum pad) of the gripping portion 46 is caused to suck one side face of the article 101 on the second conveyor 42A (one side face on the YZ plane in FIG. 7), the flap plate 51 has a role of supporting, for example, the other side face opposite to the aforementioned one side face of the article 101. That is, the flap plate 51 helps the suction portion 46A suck the article 101. This prevents the article 101 from falling or shifting, which may occur when the article 101 is scooped up by the comb-tooth shaped member described later.

Figure 7:
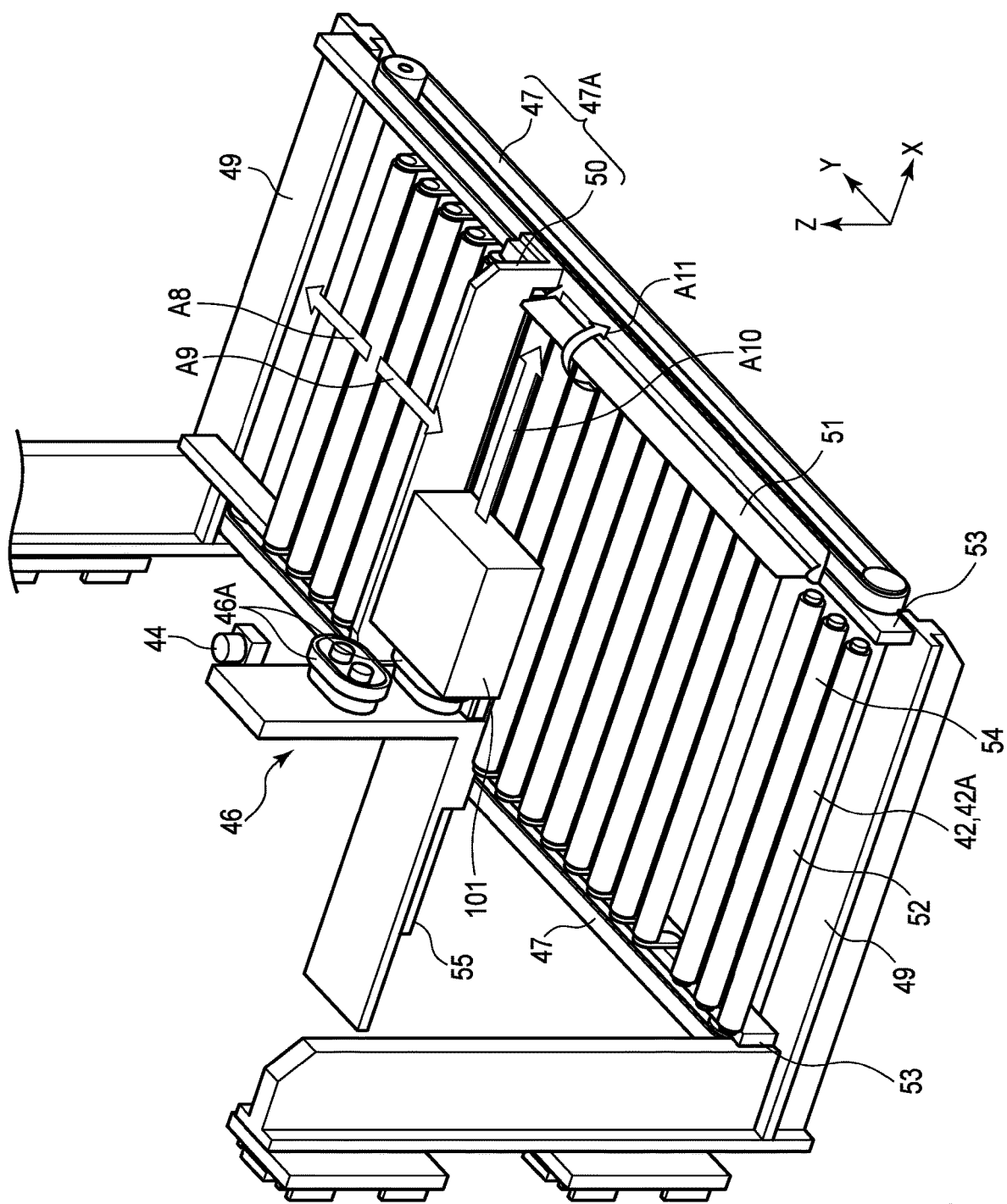
FIG. 7 is a perspective view illustrating an exemplary configuration on the periphery of a second conveyor portion and a gripping portion of the body core portion.

When the article 101 collides with the flap plate 51 relatively strongly, for example when the gripping portion 46 grips the article 101 by suction and is moved in the direction indicated by arrow A10 in FIG. 7, the flap plate 51 turns with its end attached to the frame end 53 as a pivot as indicated by arrow A11 and falls onto the belt face of the positioning plate driving belt 47. In this manner, the flap plate 51 becomes substantially equal in level to the conveyor face 54 of the second conveyor 42A.

The flap plate 51 takes, for example, a first state in which it stands upright with respect to the second conveyor 42A, and a second state in which it falls down with respect to the second conveyor 42A. The flap plate 51 takes the first state, for example when the suction portion 46A of the gripping portion 46 is caused to suck the article 101 on the second conveyor 42A, and takes the second state, for example when the flap plate 51 is pressed relatively strongly by the article 101. Alternatively, the flap plate 51 may make a transition from the first state not to the second state but to a state in which the flap plate 51 is inclined by being pressed by the article 101. When the flap plate 51 is released from the pressed state (the second state or the inclined state), it returns to the first state by the elasticity of the spring. As described above, the flap plate 51 is a movable flap mechanism that supports the article 101 on the second conveyor 42A of the second conveyor portion 42 when it is gripped with the gripping portion 46.

Figure 8A:
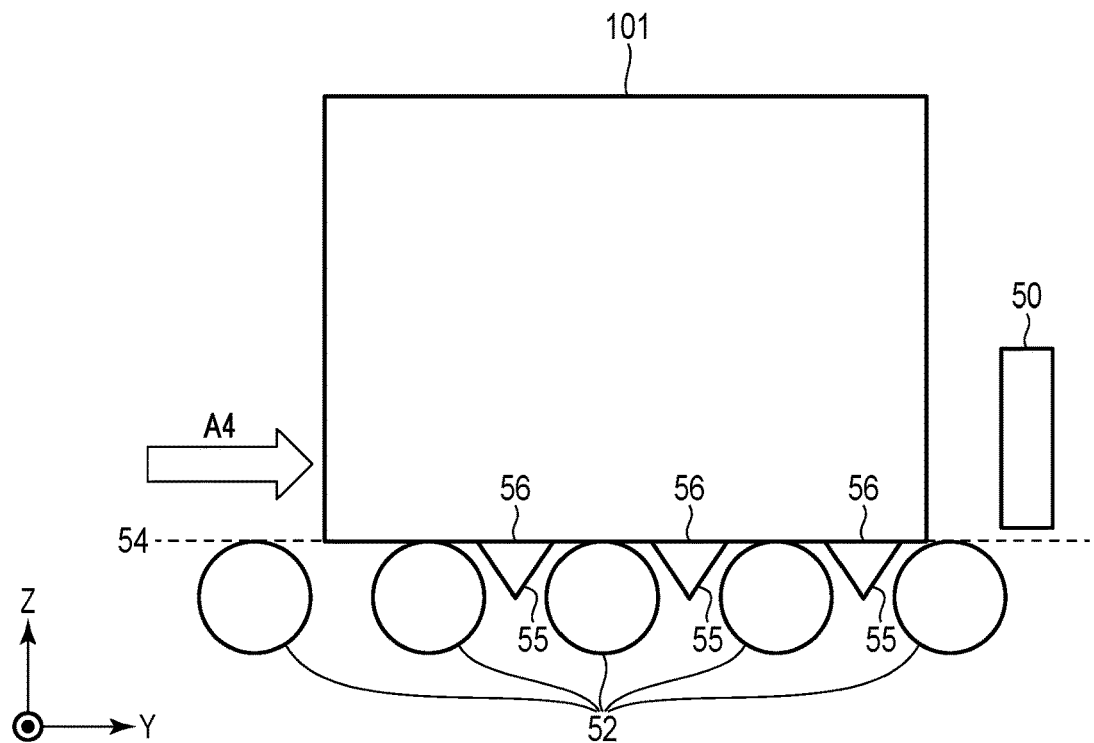
FIG. 8A is a diagram illustrating an example of operation of gripping an article with a gripping portion.
Figure 8B:
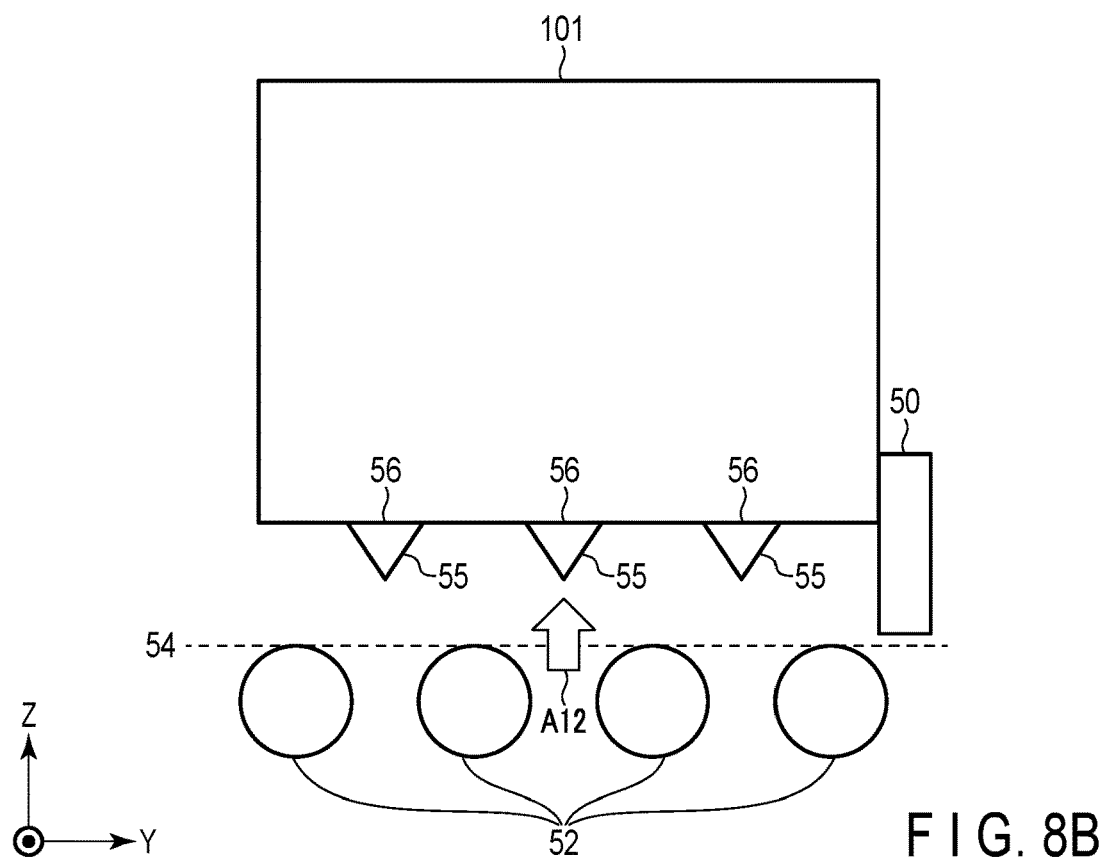
FIG. 8B is a diagram illustrating an example of operation of gripping an article with the gripping portion.

FIGS. 8A and 8B are diagrams each schematically illustrating an example of operation of gripping the article 101 with the gripping portion 46. The gripping portion 46 has, for example, the fork 55 extending in the X direction as the comb-tooth shaped member. The fork 55 is arranged in a vertically movable manner between the rollers 52 of the second conveyor 42A. The fork 55 can be moved (pulled out/inserted) in the X direction under the control of the mechanism control portion 88 during the gripping operation by the gripping portion 46. The fork 55 has a gripping face 56 that comes into contact with the bottom face of the article 101. The gripping face 56 is arranged below the level of the conveyor face 54 when the article 101 is not scooped up.

The article 101 is conveyed on the second conveyor 42A in a direction indicated by arrow A4 in FIG. 8A. At this time, the position of the positioning plate 50 is appropriately set on the second conveyor 42A according to the size of the article 101. The fork 55 comes into contact with the bottom face of the article 101 via the gripping face 56. The fork 55 grips the article 101 while supporting the bottom face of the article 101 via the gripping face 56. The fork 55 scoops up the article 101 in the direction indicated by arrow A12 in FIG. 8B by the mechanism control portion 88 controlling the arm 45. By setting the position of the positioning plate 50, the article 101 is stably scooped up at an appropriate gripping position by the gripping face 56 of the fork 55.

FIGS. 9A and 9B are diagrams each schematically illustrating an example of operation of loading with the gripping portion 46 illustrated in FIGS. 8A and 8B. The gripping portion 46 loads the article 101 onto a desired position of the accumulating portion 110 by the arm 45 moving in a desired three-dimensional direction while supporting the bottom face of the article 101 with the fork 55. For example, as shown in FIG. 9A, the article 101 is brought to the accumulating portion 110, for example, on the intermediate shelf 113 of the RBP 111. Then, the fork 55 is pulled out in the direction indicated by arrow A13 in FIG. 9B by the mechanism control portion 88 controlling the gripping portion 46, and the article 101 is unloaded onto a desired position on the intermediate shelf 113.

The position at which the article 101 is placed is not limited to the intermediate shelf 113. The gripped article 101 may be placed on an article already placed in the accumulating portion 110.

The gripping portion 46 having the fork 55 is an example, and the gripping portion 46 is not limited thereto. The gripping portion may grip the article 101 from both sides. Alternatively, instead of the fork 55, the gripping portion 46 may have a pop-up member 57 that pushes up the article 101 on the second conveyor 42A of the second conveyor portion 42.

FIGS. 10A and 10B are diagrams each schematically illustrating an example of operation of gripping an article with the gripping portion 46. The pop-up member 57 has one or more extrusion portions 58 each arranged between the rollers 52 of the second conveyor 42A. The pop-up member 57 can be vertically moved in the Z direction, that is, can be projected and retracted with respect to the conveyor face 54 under the control of the mechanism control portion 88. The extrusion portion 58 is arranged below the level of the conveyor face 54 when the article 101 is not gripped.

As shown in FIG. 10B, the gripping portion 46 has a bottom face-supporting portion 59A configured to support the bottom face of the article 101 and side face-holding portions 59B configured to hold the side faces of the article 101. In other words, the gripping portion 46 includes a gripping member configured to grip at least the bottom face of the article 101.

The article 101 is conveyed on the second conveyor 42A in a direction indicated by arrow A4 in FIG. 10A. The extrusion portion 58 of the pop-up member 57 presses the bottom face of the article 101 from below to lift the article 101 in the direction indicated by arrow A12 in FIG. 10B, thereby creating a gap G between the conveyor face 54 of the second conveyor 42A and the bottom face of the article 101. The gripping portion 46 enters the vicinity of the article 101 in the X direction. Then, the bottom face-supporting portion 59A serving as a claw of the gripping portion 46 enters the gap G in the direction indicated by arrow A4 in FIG. 10B, thereby gripping the article 101 while supporting its bottom face. The side faces of the article 101 are held by, for example, the side face-holding portions 59B. The gripping portion 46 lifts the article 101 in the Z direction by the mechanism control portion 88 controlling the arm 45. The positioning plate 50 is the same as that described with reference to FIGS. 8A and 8B.

Thus, in the body core portion 40, since the arm 45 accesses the accumulating portion 110 in the horizontal direction, articles can be loaded under the intermediate shelf 113 of the RBP 111. In addition, since the conveyance direction of the second conveyor 42A of the second conveyor portion 42 is set to the Y direction orthogonal to the X direction, which is the basic direction in which the gripping portion 46 of the body core portion 40 accesses the accumulating portion 110, loading can be processed at high speed. Furthermore, since the loading operation is performed after the attitude of the article 101 is aligned by the movable positioning plate 50, articles in a stacked state can be aligned in terms of the horizontal and vertical directions.

In a case of using the cargo handling apparatus 10 as an unloading apparatus, under the control of the control device 80, the body core portion 40 can cause the gripping portion 46 to grip one by one the articles 101 from the article group 102 in the accumulating portion 110 arranged in the accumulated article-processing portion 60 based on the loading information acquired by the second sensor 41, to move the gripped article 101 to the second conveyor 42A of the second conveyor portion 42, and to feed the moved article 101 to the vertically moving/phase-changing conveyor 26 of the individual article-processing portion 20. In this case, the positioning plate driving belt 47, the positioning plate 50, the flap plate 51, etc., described with reference to FIG. 7 may be unnecessary.

The accumulated article-processing portion 60 will be described with reference to FIGS. 3 and 11A to 11C. The accumulated article-processing portion 60 is arranged downstream of the body core portion 40 in such a manner as to be adjacent to the body core portion 40. In the accumulated article-processing portion 60, the accumulating portion 110 on which the articles 101 are placed is arranged. In a case of using the cargo handling apparatus 10 as a loading apparatus, the accumulated article-processing portion 60 corresponds to a latter-stage processing portion on which the articles 101 are ultimately placed. Note that the accumulated article-processing portion 60 itself does not directly process the articles 101. The accumulated article-processing portion 60 mainly comprises a mechanism for safely installing the accumulating portion 110 in the cargo handling apparatus 10.

As shown in FIG. 3, the accumulated article-processing portion 60 includes a third sensor 61, a fourth sensor 62, a fifth sensor 63, and the operation input portion 64. The operation of each of the sensors 61, 62, and 63 is controlled by the control device 80.

Figure 11A:
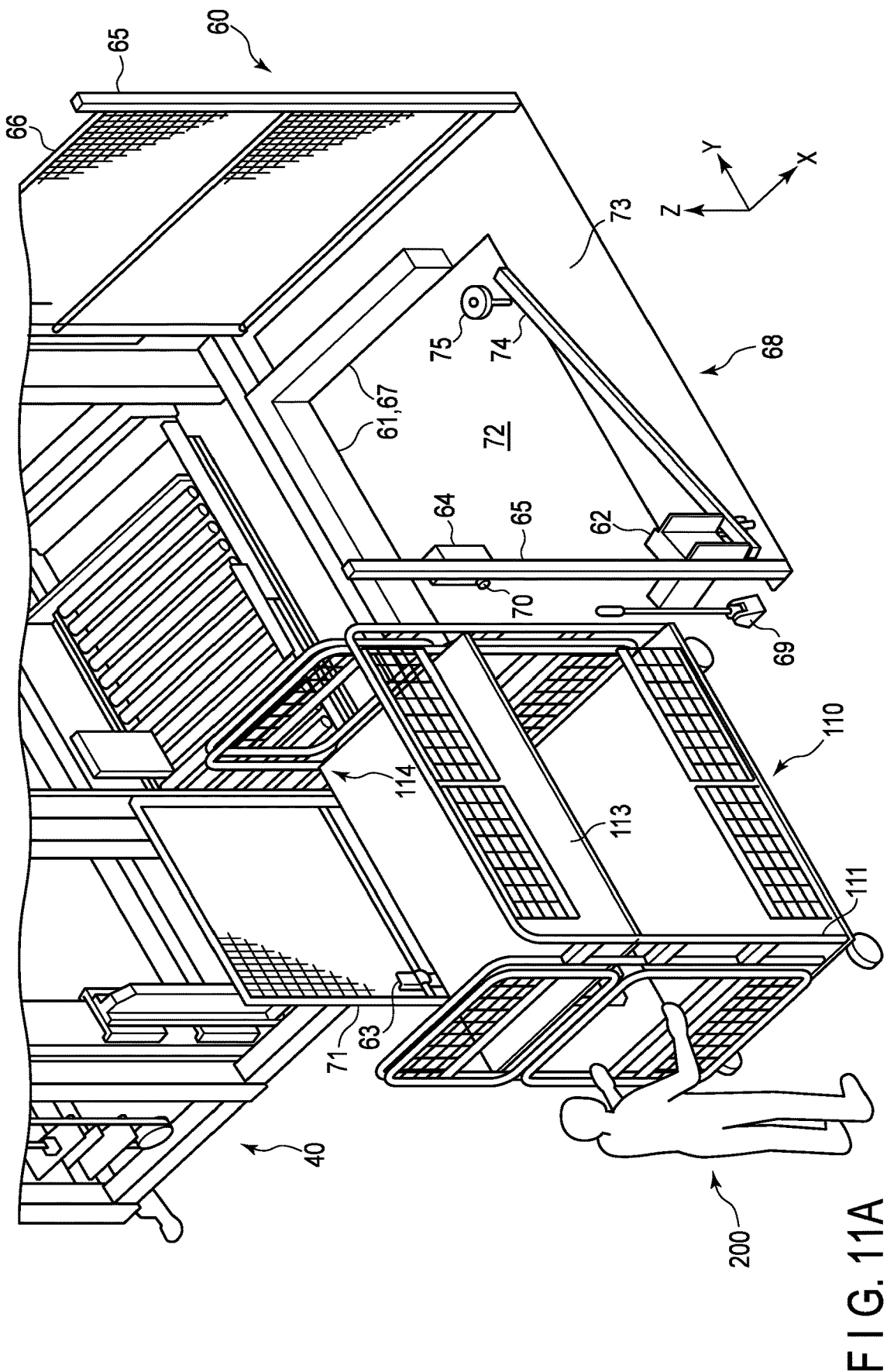
FIG. 11A is a diagram illustrating an example of operation of installing an accumulating portion in an accumulated article-processing portion.
Figure 11B:
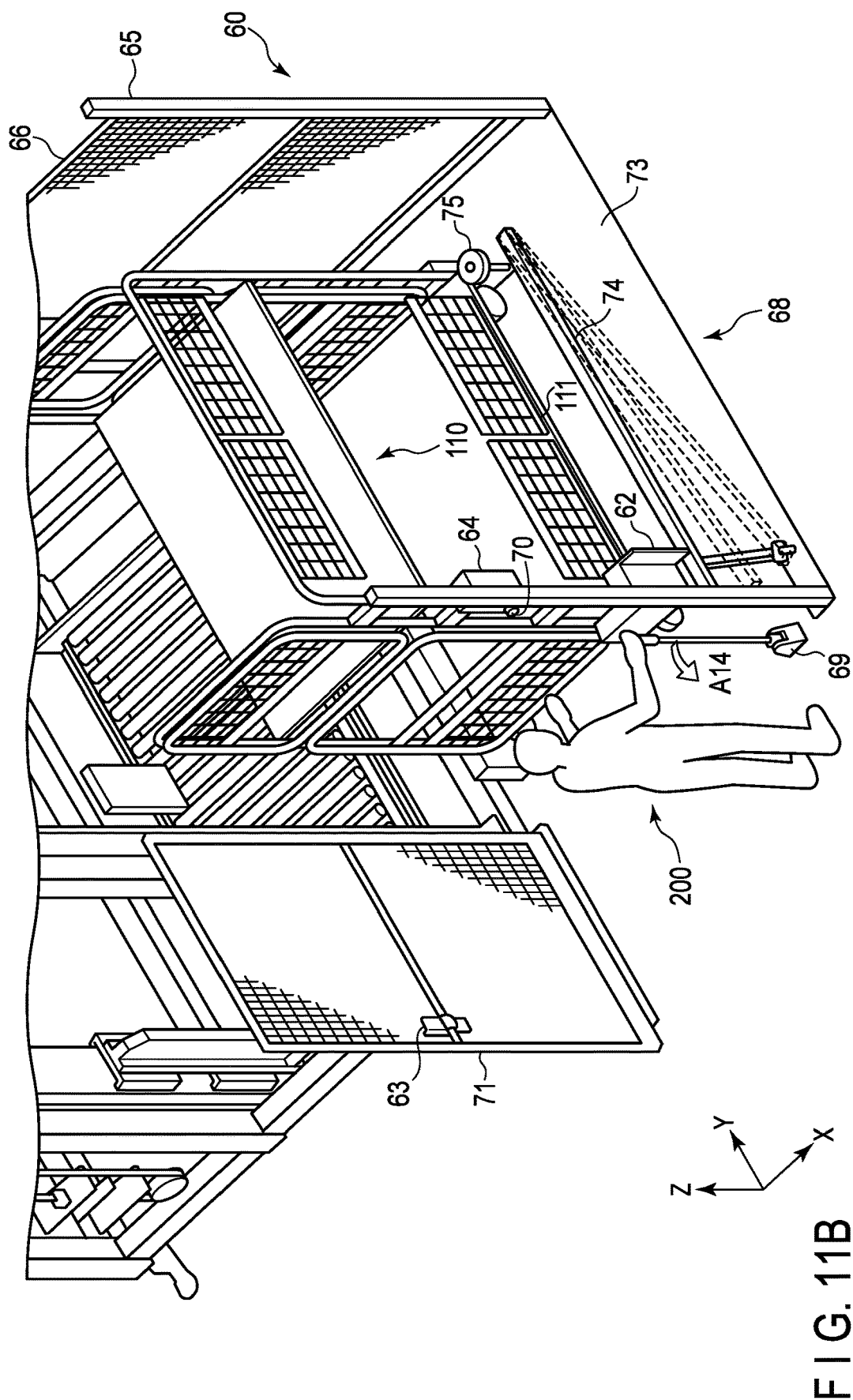
FIG. 11B is a diagram illustrating an example of operation of installing the accumulating portion in the accumulated article processing portion.
Figure 11C:
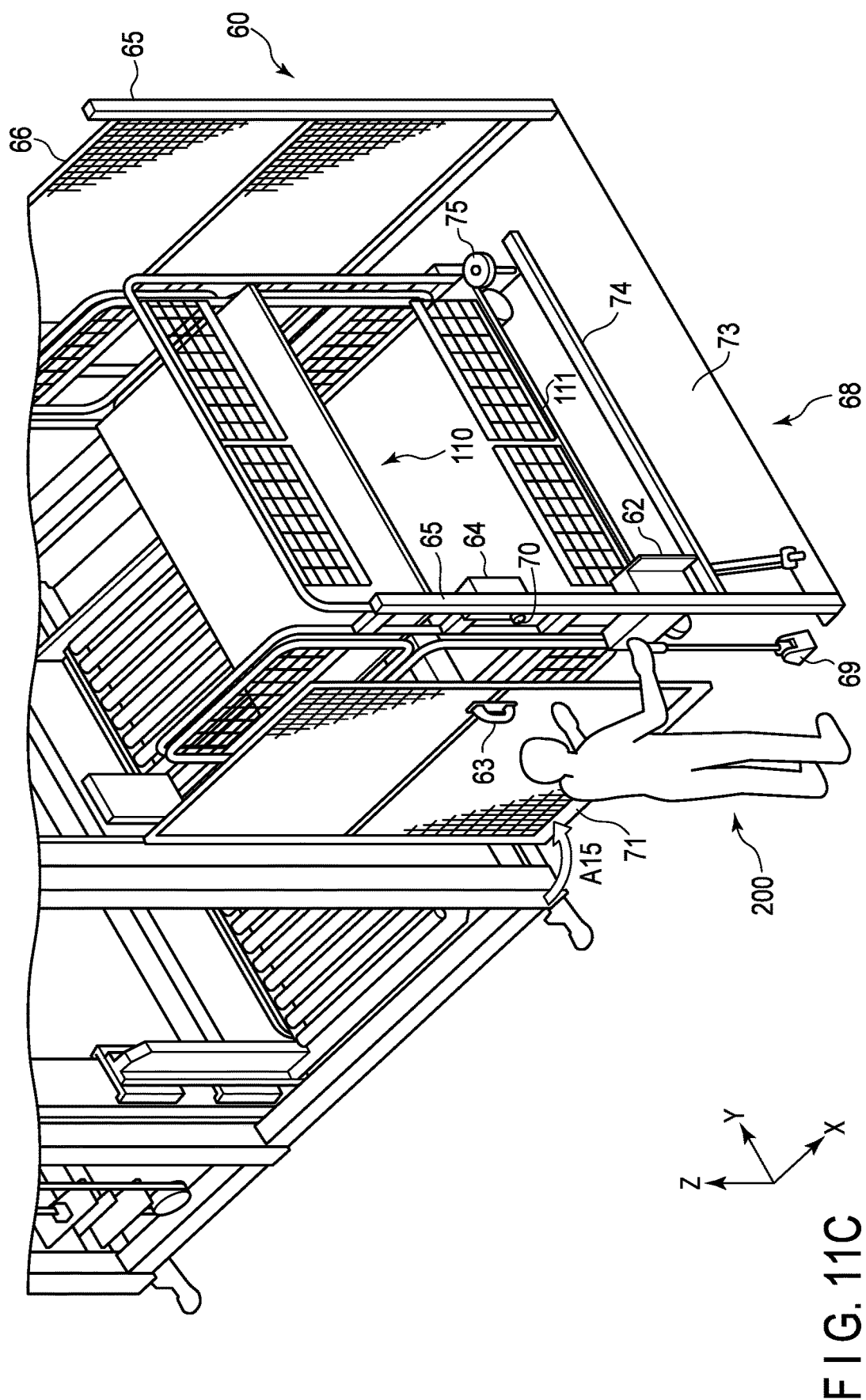
FIG. 11C is a diagram illustrating an example of operation of installing the accumulating portion in the accumulated article-processing portion.

As shown in FIGS. 11A to 11C, the accumulated article-processing portion 60 includes support poles 65, a safety fence 66, an abutting portion 67, a setting mechanism 68, a set operation lever 69 (hereinafter, referred to as an operation lever 69), a start input button 70, and a safety door 71. The area of the accumulated article-processing portion 60 is defined by the four support poles 65 respectively arranged at four corners, the net-like safety fence 66 attached to the support poles 65 in such a manner as to surround the two adjacent sides, and the safety door 71 attached in an openable and closable manner to one of the safety poles 65 other than those to which the safety fence 66 is attached. The safety door 71 also includes a net-like door face. In FIGS. 11A to 11C, the safety fence 66 in front of the YZ plane is omitted.

In the accumulated article-processing portion 60, the side that faces the body core portion 40 is not covered with the safety fence. The side that faces the body core portion 40 is open in such a manner that the accumulating portion 110 in the accumulated article-processing portion 60 is accessible from the body core portion 40.

The third sensor 61 is provided in the abutting portion 67 arranged in such a manner as to extend upward in the accumulated article-processing portion 60. The abutting portion 67 is arranged on a bottom frame portion 73 that defines a recessed portion 72 corresponding to an arrangement portion in which the accumulating portion 110 is arranged. The abutting portion 67 takes, for example, a letter L shape that matches the shape of a corner 114 of the accumulating portion 110. The third sensor 61 is a sensor configured to detect that the accumulating portion 110 abuts against the abutting portion 67. The detection information by the third sensor 61 is acquired by the control device 80.

The fourth sensor 62 is provided in the setting mechanism 68. The setting mechanism 68 includes the above-described bottom frame portion 73, a bar 74 arranged on the bottom frame portion 73, and a locking member 75 attached to an end of the bar 74.

The bar 74 is operated by the operation lever 69 attached thereto. Before the operator 200 installs the accumulating portion 110 in the accumulated article-processing portion 60, the bar 74 is in an oblique position in the XY plane, as shown in FIG. 11A.

When the accumulating portion 110 is installed in the accumulated article-processing portion 60 in such a manner as to abut against the abutting portion 67, the operator operates the operation lever 69 as indicated by arrow A14 in FIG. 11B. The bar 74 is moved as indicated by the broken line in FIG. 11B by operating the operation lever 69 in the direction indicated by arrow A14 in FIG. 11B, for example. After the operation, the bar 74 extends in parallel to the Y direction as indicated by the solid line in FIG. 11B. At this time, the locking member 75 is engaged with the accumulating portion 110, thereby locking the accumulating portion 110.

The fourth sensor 62 is a sensor configured to detect that the setting mechanism 68 is locked by the operation of the operation lever 69 after the accumulating portion 110 is installed in an appropriate place. The detection information by the fourth sensor 62 is acquired by the control device 80. The accumulating portion 110 is fixed relative to the body core portion 40 by the setting mechanism 68.

As described above, the setting mechanism 68 and the operation lever 69 constitute a locking mechanism that locks the accumulating portion 110, that is, fixes it so as not to move when the accumulating portion 110 is arranged in the recessed portion 72 of the accumulated article-processing portion 60. The fourth sensor 62 is a detecting portion configured to detect locking of the locking mechanism.

The fifth sensor 63 is provided in the safety door 71. The fifth sensor 63 is a sensor configured to detect opening and closing of the safety door 71. The fifth sensor 63 is a detecting portion configured to detect that, for example, the safety door 71 is closed. The safety door 71 is closed by being pivotally turned as indicated by arrow A15 in FIG. 11C. The detection information by the fifth sensor 63 is acquired by the control device 80.

In FIG. 11C, for convenience of illustration, the safety door 71 does not completely cover the periphery of the accumulated article-processing portion 60; however, in reality, the safety door 71 is a part of the safety fence that completely covers the aforementioned periphery. When the safety door 71 is closed, the safety door 71 covers the operation lever 69, too, so that the operation lever 69 is not accessible from the outside of the safety door 71.

A start input button 70 is provided in, for example, the support poles 65. The start input button 70 serves as an operation input portion 64 to receive an input for starting loading to the control device 80.

When the loading to the accumulating portion 110 arranged in the accumulated article-processing portion 60 is completed, this state is displayed on a display device (not shown). The operator 200 releases the fixing of the accumulating portion 110 by releasing the operation lever 69 by a procedure reverse to that at the time of installing the accumulating portion 110, and carries away the accumulating portion 110.

The series of installation/carry-away operations of the accumulating portion 110 can be replaced with operations performed by a system including a driving source and a control portion, instead of human power by the operator 200.

As described above, the accumulated article-processing portion 60 is provided with a mechanism capable of docking and releasing with respect to the body core portion 40 flexibly in response to the type (the RBP 111, the flat pallet 112, the balance truck, etc.) and the size of the accumulating portion 110. Furthermore, the accumulated article-processing portion 60 includes the safety fence 66, the third sensor 61, the fourth sensor 62 and the fifth sensor 63, and the safety door 71, which are provided to ensure safety during the operation of the cargo handling apparatus 10.

The accumulated article-processing portion 60 described above is merely an example. The accumulated article-processing portion 60 may take, for example, a configuration that includes a locking mechanism including the setting mechanism 68 and the operation lever 69 but does not include the fourth sensor 62 configured to detect locking of the locking mechanism, or a configuration that includes the safety fence 66 and the safety door 71 but does not include the fifth sensor configured to detect that the safety door 71 is closed.

In a case of using the cargo handling apparatus 10 as an unloading apparatus, the accumulated article-processing portion 60 serves as a pre-stage processing portion for the article 101 to be unloaded from the accumulating portion 110. In the accumulated article-processing portion 60 in a case of functioning as a pre-stage processing unit, the accumulating portion 110 on which the article group 102 is placed is arranged as described above.

The accumulated article-processing portion 60 described above is an example which does not limit the safety door 71 in the accumulated article-processing portion 60 in terms of number and position and the accumulating portion 110 in terms of carrying-in direction and carrying-out direction with respect to the setting mechanism 68. In FIGS. 11A to 11C, one safety door 71 is provided on one side face (XZ plane), from which the accumulating portion 110 is carried in and out (side face switch-back type); however, for example, one safety door may be provided on one side face (YZ plane) parallel to the side open to the body core portion 40, from which the accumulating portion 110 may be carried in and out (front face switch-back type). Alternatively, safety doors may be respectively provided on both sides, and the accumulating portion 110 may be carried in from one side and carried out from the other side (side drive-through type). In addition, the accumulating portion 110 may be arranged in the recessed portion 72 of the setting mechanism 68 in such a manner as to be turnable with respect to the second conveyor 42A (caster fulcrum twisting type), or a turntable may be further provided in the recessed portion 72 in the front switch-back type (turntable type).

A configuration of the accumulated article-processing portion 60 is appropriately selected from various configurations such as described above, depending on, in particular, a package conveyance layout in the use environment. By designing the accumulated article-processing portion 60 to be selectable, it is possible to develop variations in the configuration of the cargo handling apparatus 10.

As described above, the cargo handling apparatus 10 according to the present embodiment is a cargo handling apparatus that is based on an existing unloading apparatus and is capable of loading and unloading. The cargo handling apparatus 10 is an apparatus flexibly adaptable to a use environment and an operation condition.

The cargo handling apparatus 10 is configured by a combination of components including the individual article-processing portion 20, the body core portion 40, and the accumulated article-processing portion 60. Each component is configured to be capable of handling both unloading and loading, or to be intended for unloading only or loading only but be replaceable. With the components in suitable combination, the cargo handling apparatus 10 can handle both unloading and loading.

The cargo handling apparatus 10 achieves reduction in apparatus size and installation area without a vertical articulated robot being used to grip the article 101 to be loaded. For example, the configuration in which a vertical articulated robot is used to grip the article 101 increases an installation area including a safety fence because the periphery of the apparatus is covered with the safety fence in order to prevent the contact of a human with a movable portion of the cargo handling apparatus 10 during operation. That is, the conveyance configuration in which the plurality of conveyors 22, 25, 26, and 42A are combined with the orthogonal-type arm 45 capable of three-dimensional movement enables the cargo handling apparatus 10 according to the present embodiment to reduce the size and the installation area of the apparatus, thereby realizing space saving.

The cargo handling apparatus 10 according to the present embodiment is advantageous in terms of processing speed, too. That is, the cargo handling apparatus 10 can realize high-speed loading by adopting the configuration in which the plurality of conveyors are combined with the orthogonal-type arm capable of three-dimensional movement. Furthermore, the cargo handling apparatus 10 can increase the speed of loading by the second conveyor 42A having the conveyance direction substantially orthogonal to the basic direction in which the gripping portion 46 accesses the accumulating portion 110. For example, if the conveyor direction of the second conveyor 42A and the access direction of the gripping portion 46 with respect to the accumulating portion 110 are the same, a standby time occurs so that the operation of the second conveyor 42A and the operation of the gripping portion 46 do not interfere with each other. If the two directions are substantially orthogonal to each other, the standby time can be reduced.

In addition, with the cargo handling apparatus 10, use of the orthogonal arm 45 is advantageous for the arrangement of the second sensor 41 arranged above the accumulating portion 110. For example, the cargo handling apparatus 10 allows the second sensor 41 to be easily arranged in an appropriate place above the accumulating portion 110, thereby facilitating proper recognition of the article group 102 in the accumulating portion 110.

In addition, the cargo handling apparatus 10 can perform suitable processing on each of the irregular articles 101 having different sizes and weights and stack them on the accumulating portion 110. For example, the cargo handling apparatus 10 can perform loading with a high filling rate by the individual article-processing portion 20 recognizing the sizes, weights, and the like of individual articles.

Hereinafter, an example of the loading operation by the cargo handling system 1 will be described with reference to FIGS. 12 to 15.

Figure 12:
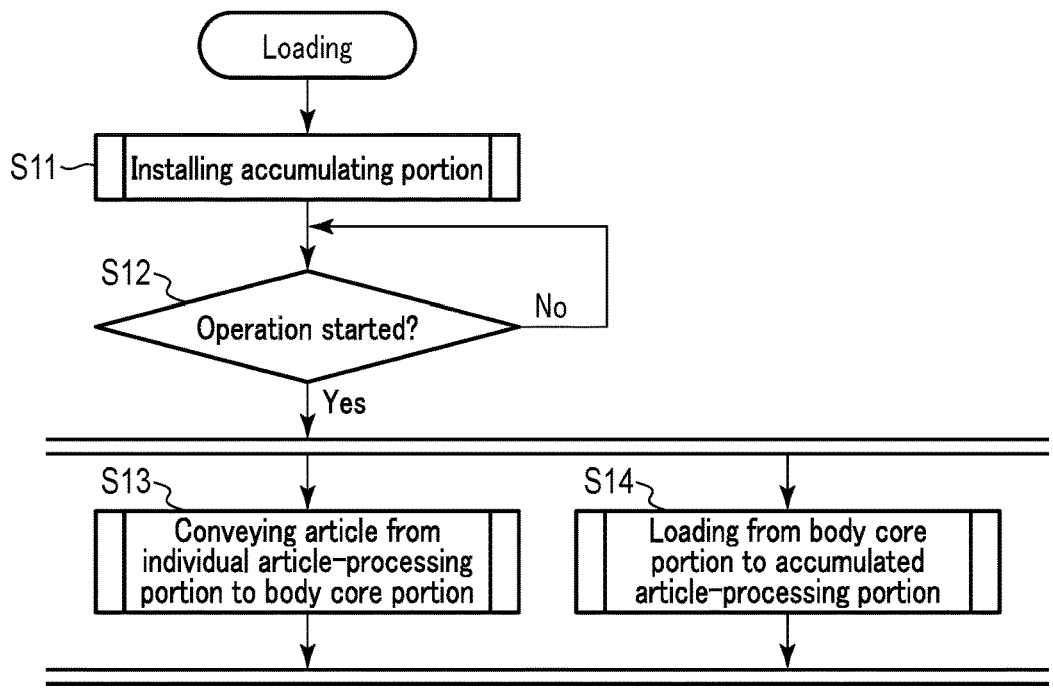
FIG. 12 is a flowchart illustrating an example of loading with the cargo handling apparatus.

FIG. 12 is a flowchart illustrating an example of loading by the cargo handling system 1. In step S11, processing of the accumulating portion is executed.

Figure 13:
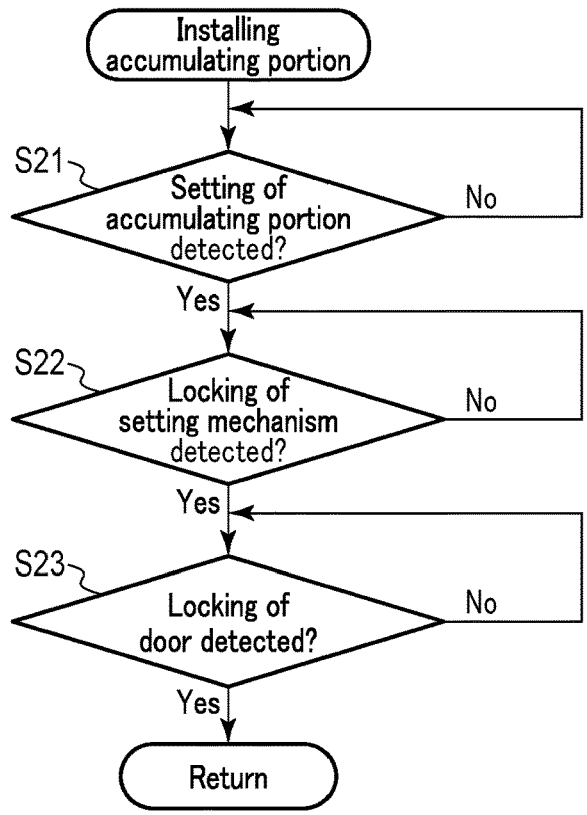
FIG. 13 is a flowchart illustrating an example of installing the accumulating portion.

FIG. 13 is a flowchart illustrating an example of installing the accumulating portion. In step S21, the control device 80 (processor 82) determines whether or not the third sensor 61 detects that the accumulating portion 110 abuts against the abutting portion 67, that is, whether or not the accumulating portion 110 has been set in an appropriate place of the setting mechanism 68. The control device 80 stands by until it is determined that detection has been performed, and if it is determined that detection has been performed (Yes in step S21), the processing proceeds to step S22.

In step S22, the control device 80 determines whether or not the fourth sensor 62 has detected locking of the setting mechanism 68. The control device 80 stands by until it is determined that detection has been performed, and if it is determined that detection has been performed (Yes in step S22), the processing proceeds to step S23.

In step S23, the control device 80 determines whether or not the fifth sensor 63 has detected locking of the safety door 71. The control device 80 stands by until it is determined that detection has been performed, and if it is determined that detection has been performed (Yes in step S23), the processing returns.

If all of the third sensor 61, the fourth sensor 62, and the fifth sensor 63 of the accumulated article-processing portion 60 detect locking, the control device 80 determines that the accumulating portion 110 has been installed in the accumulated article-processing portion 60. After step S11, the control device 80 proceeds to step S12.

In step S12, the control device 80 determines whether or not an operation start input has been received. The operation start input is performed, for example, by the operator 200 who installed the accumulation portion, pressing the start input button 70 of the operation input portion 64 in the accumulated article-processing portion 60. The control device 80 stands by until an input is received, and starts the loading processing if the input is received (Yes in step S12).

The control device 80 executes the processing in step S13 and the processing in step S14 in parallel. That is, in step S13, the control device 80 starts conveyance of the article 101 from the individual article-processing portion 20 to the body core portion 40. At the same time, in step S14, the control device 80 starts loading from the body core portion 40 to the accumulated article-processing portion 60.

Figure 14:
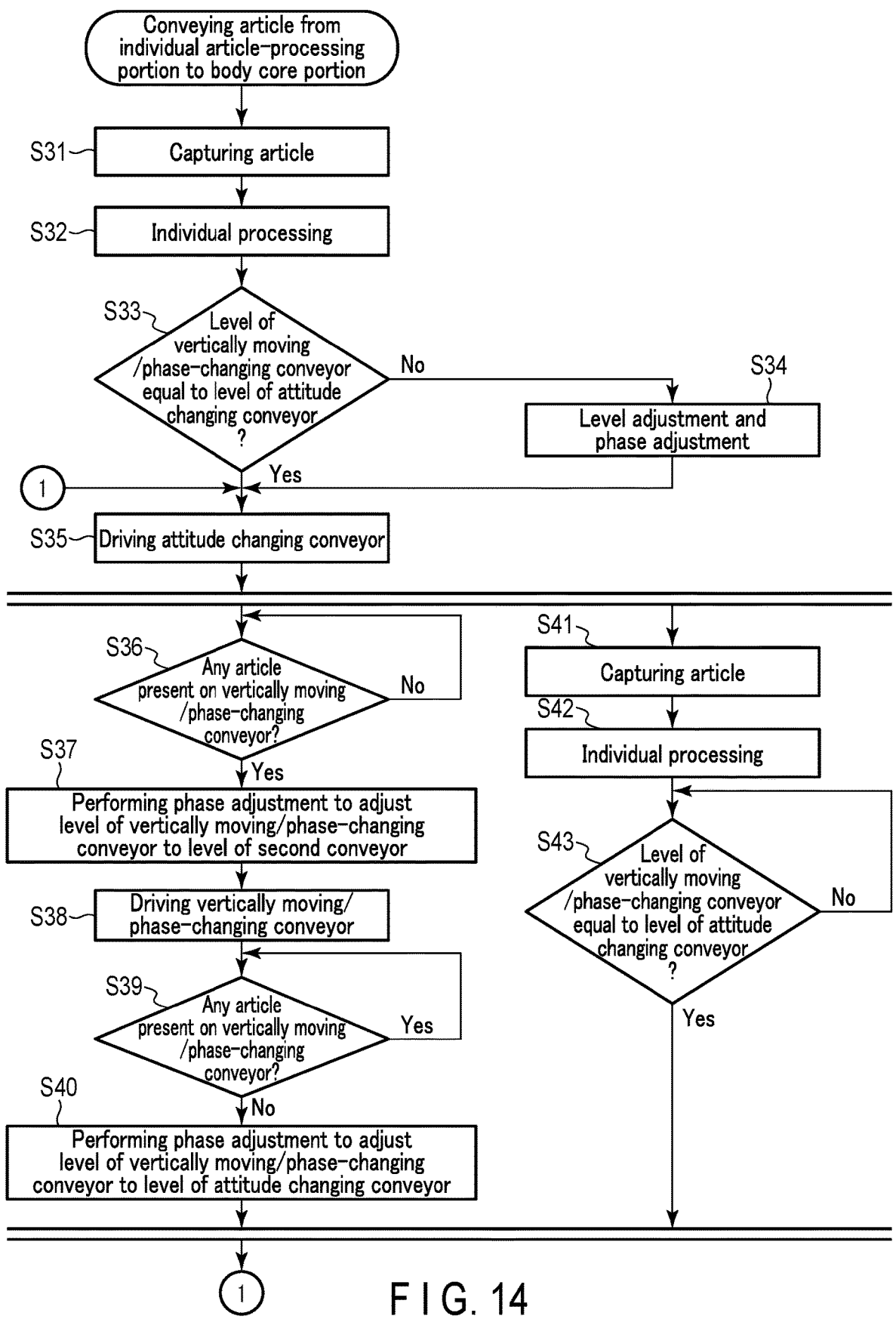
FIG. 14 is a flowchart illustrating an example of conveyance of articles from the individual article-processing portion to the body core portion.

FIG. 14 is a flowchart illustrating an example of conveyance of the article 101 from the individual article-processing portion 20 to the body core portion 40.

In step S31, the control device 80 captures one article 101 to place it onto the receiving conveyor 22 by controlling the operation of the damming plate 21.

Next, in step S32, the control device 80 executes each instance of processing. To be more specific, on the receiving conveyor 22, the weight of the article 101 is measured by the weight measuring device 23 and the article 101 is detected (for example, imaged) by the first sensor 24, and thereafter, on the subsequent attitude changing conveyor 25, the attitude changing of the article 101 and the like are performed. The attitude changing is performed, for example, by the mechanism control portion 88 controlling the operation of the attitude changing mechanism of the attitude changing conveyor 25 based on the size information that is calculated by the recognition portion 86 of the control device 80 based on the detection information from the first sensor 24.

In step S33, the control device 80 determines whether or not the level of the vertically moving/phase-changing conveyor 26 is equal to the level of the attitude changing conveyor 25. If the levels are not equal (No in step S33), in step S34, the control device 80 controls the operation of the conveyor moving mechanism 27 to adjust the level of the vertically moving/phase-changing conveyor 26 to the level of the attitude changing conveyor 25. At the same time, the control device 80 also performs phase adjustment of the vertically moving/phase-changing conveyor 26 in such a manner as to set the conveyance direction of the vertically moving/phase-changing conveyor 26 to the X direction.

After step S34, or if the levels are adjusted to each other in step S33 (Yes in step S35), the control device 80 proceeds to step S35.

In step S35, the control device 80 drives the attitude changing conveyor 25. This causes the article 101 on the attitude changing conveyor 25 to be conveyed to the vertically moving/phase-changing conveyor 26 that is adjusted in terms of level and phase to the attitude changing conveyor 25.

After step S35, the control device 80 executes the processing from step S36 to step S40 and the processing from step S41 to step S43 in parallel.

The processing from step S36 to step S40 is processing relating to the conveyance of the article 101 on the vertically moving/phase-changing conveyor 26 of the individual article-processing portion 20 to the second conveyor 42A of the body core portion 40.

In step S36, the control device 80 determines whether or not the article 101 is present on the vertically moving/phase-changing conveyor 26. The presence or absence of the article 101 on the vertically moving/phase-changing conveyor 26 may be determined based on, for example, detection information by a sensor (not shown) capable of detecting an article on the vertically moving/phase-changing conveyor 26. The control device 80 stands by until the article 101 is sent from the attitude changing conveyor 25 to the vertically moving/phase-changing conveyor 26, and proceeds to step S37 if it is determined that the article 101 is on the vertically moving/phase-changing conveyor 26 (Yes in step S36).

In step S37, the control device 80 controls the operation of the conveyor moving mechanism 27 to adjust the level of the vertically moving/phase-changing conveyor 26 to the level of the second conveyor 42A. At the same time, the control device 80 also performs phase adjustment of the vertically moving/phase-changing conveyor 26 in such a manner as to set the conveyance direction of the vertically moving/phase-changing conveyor 26 to the Y direction.

In step S38, the control device 80 drives the vertically moving/phase-changing conveyor 26. This causes the article 101 on the vertically moving/phase-changing conveyor 26 to be conveyed to the second conveyor 42A of the body core portion 40.

In step S39, the control device 80 determines whether or not the article 101 is present on the vertically moving/phase-changing conveyor 26, as in step S36. The control device 80 stands by until the article 101 is sent from the vertically moving/phase-changing conveyor 26 to the second conveyor 42A, and proceeds to step S40 if it is determined that the article 101 is absent (No in step S39).

In step S40, the control device 80 controls the operation of the conveyor moving mechanism 27 to adjust the level of the vertically moving/phase-changing conveyor 26 to the level of the attitude changing conveyor 25. At the same time, the control device 80 also performs phase adjustment of the vertically moving/phase-changing conveyor 26 in such a manner as to set the conveyance direction of the vertically moving/phase-changing conveyor 26 to the X direction.

The processing from step S41 to step S43 is processing relating to the conveyance of the article 101 from the receiving conveyor 22 of the individual article-processing portion 20 to the vertically moving/phase-changing conveyor 26 via the attitude changing conveyor 25.

In step S41, the control device 80 captures and takes one article 101 into the receiving conveyor 22 by controlling the operation of the damming plate 21, as in step S31.

In step S42, the control device 80 executes individual processing, as in step S32.

In step S43, the control device 80 determines whether or not the level of the vertically moving/phase-changing conveyor 26 is equal to the level of the attitude changing conveyor 25. The control device 80 stands by until the levels are adjusted to each other, and returns to step S35 if it is determined that the levels have been adjusted to each other (Yes in step S43). Step S43 is a step for confirming that step S40 has been completed, in other words, a step for confirming whether or not the article 101 can be transferred from the attitude changing conveyor 25 to the vertically moving/phase-changing conveyor 26.

Figure 15:
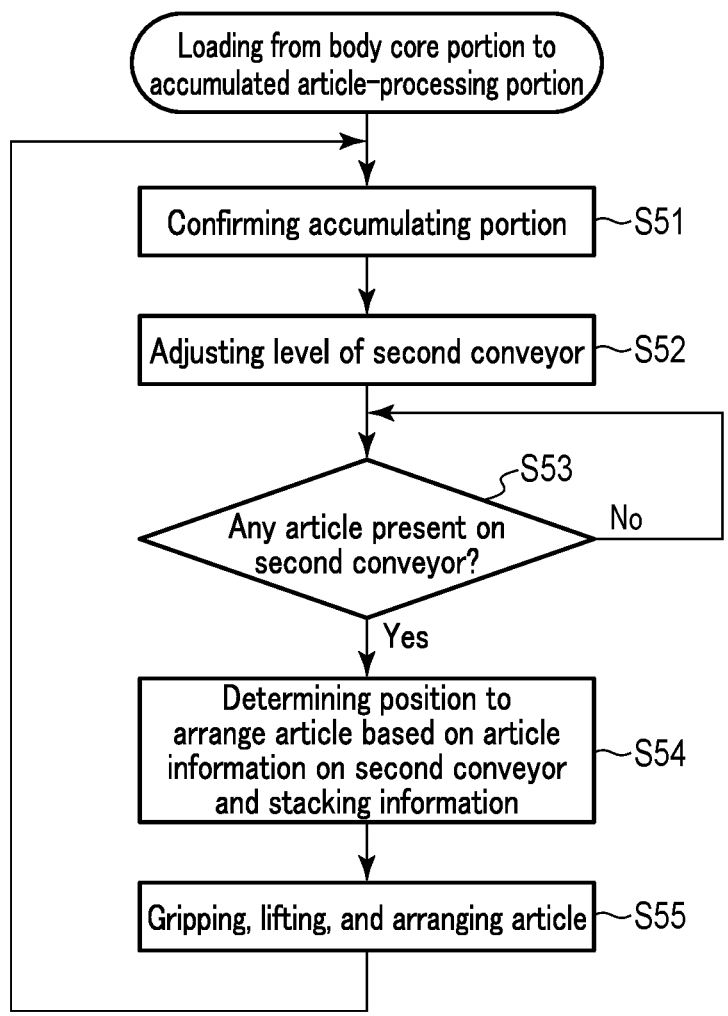
FIG. 15 is a flowchart illustrating an example of loading from the body core portion to the accumulated article-processing portion.

FIG. 15 is a flowchart illustrating an example of loading from the body core portion 40 to the accumulated article-processing portion 60.

In step S51, the control device 80 checks the status of the accumulating portion 110 via the second sensor 41. Based on detection information from the second sensor 41, the recognition portion 86 of the control device 80 recognizes, as stacking information, the arrangement of articles in the accumulating portion 110, the size of a space in which the articles can be stacked, and the like.

In step S52, the control device 80 adjusts the level of the second conveyor 42A based on the stacking information of the accumulating portion 110 confirmed in step S51. The control device 80 controls the operation of the second conveyor-vertically moving mechanism 43 to adjust the level of the second conveyor 42A to the level at which the next loading is performed in the accumulating portion 110 (for example, the level of the upper face of an article located at the highest position in the article group 102). If loading is performed on the intermediate shelf 113 of the RBP 111, the level of the second conveyor 42A may be adjusted to the level of the intermediate shelf 113.

In step S53, the control device 80 determines whether or not the article 101 is present on the second conveyor 42A. The presence or absence of the article 101 on the second conveyor 42A may be determined based on, for example, detection information by a sensor (not shown) capable of detecting an article on the second conveyor 42A or by the LRF 44. The control device 80 stands by until it is determined that the article 101 is present, and proceeds to step S54 if it is determined that the article 101 is present on the second conveyor 42A (Yes in step S53).

In step S54, the control device 80 determines a position to arrange an article, based on article information of an article on the second conveyor 42A and stacking information of stacking on the accumulating portion 110. The article information of an article on the second conveyor 42A is acquired from the detection information by the first sensor 24 of the individual article-processing portion 20. For example, as shown in FIG. 6, the plan processing portion 87 of the control device 80 calculates and determines arrangement information with respect to the accumulating portion 110, from stacking information on the article group 102 within the accumulating portion 110, which the recognition portion 86 acquires from the second sensor 41 and the LRF 44, and the aforementioned article information.

In step S55, the control device 80 controls the operation of the arm 45 and the gripping portion 46, thereby gripping and lifting the article 101 on the second conveyor 42A, as well as arranging it in the accumulating portion 110. The mechanism control portion 88 controls the operation of the arm 45 and the gripping portion 46 based on the arrangement information calculated by the plan processing portion 87 as described above. After step S55, the processing in step S51 and the subsequent steps is repeated.

As described above, the cargo handling apparatus 10 according to the first embodiment is configured to: recognize the size and the orientation of each of the articles 101 in the order of flow from the conveyor 100; cause the control device 80 to determine a loading plan which realizes as high a filling rate as possible within a range in which the aforementioned order is maintained, that is, without changing the conveyance order; and perform loading on the accumulating portion 110 by control based on the aforementioned determination.

The above description was made based on the assumption that the conveyance direction of the article 101 by the first conveyor portion 30 is the X direction, the conveyance direction of the article 101 by the second conveyor portion 42 is the Y direction, and the conveyance direction of the article 101 by the gripping portion 46 is the X direction. However, the directions are not limited to this assumption. The second direction in which the article 101 is conveyed by the second conveyor portion 42 may be a direction intersecting the first direction in which the article 101 is conveyed by the first conveyor portion 30. The third direction in which the article 101 is conveyed by the gripping portion 46 may be a direction intersecting the second direction in which the article 101 is conveyed by the second conveyor portion 42. Therefore, the first direction and the third direction may differ from each other.

For example, the cargo handling apparatus 10 includes the individual article-processing portion 20 comprising both the first conveyor portion 30 that conveys the article 101 to be handled in the first direction (for example, the X direction) and a first detection portion (for example, the weight measuring device 23 and the first sensor 24) that detects article information relating to the article 101 being conveyed through the first conveyor portion 30. Herein, the article information includes at least one of the size, the weight, and the orientation of the article 101. The cargo handling apparatus 10 has the body core portion 40 including both the second conveyor portion 42 that receives the article 101 conveyed through the first conveyor portion 30 and conveys the received article 101 in the second direction (for example, the Y direction) intersecting the first direction, and the gripping portion 46 that grips the article 101 on the second conveyor portion 42, moves the article 101 in the third direction (for example, the X direction) intersecting the second direction, and arranges the article 101 in the accumulating portion 110. The cargo handling apparatus 10 has a second detection portion (for example, the second sensor 41) that detects stacking information indicating an arrangement state of articles in the accumulating portion 110. The cargo handling apparatus 10 has the control device 80, e.g. the mechanism control portion 88, which controls the operation of the gripping portion 46 based on the article information and the stacking information.

In the cargo handling apparatus 10 according to the present embodiment, in order to increase the speed, the loading access main direction of the arm 45 and the conveyance direction of the second conveyor portion 42 in the cargo handling apparatus 10 are made to intersect, for example, to be orthogonal to each other. For example, in a case of using the cargo handling apparatus 10 as the unloading apparatus, the unloaded article is discharged to the outside from the second conveyor portion 42, so that the unloading operation of the next article can be performed immediately. That is, both of the second conveyor portion 42 and the arm 45 can quickly move to the next appropriate position. Even in a case of using the cargo handling apparatus 10 as a loading apparatus, the level of the vertically moving/phase-changing conveyor 26 is adjusted to the level of the second conveyor portion 42, so that the article 101 can be immediately fed to the second conveyor portion 42 positioned in the level at which the article 101 is to be loaded. This leads to an increase in the speed of cargo handling.

The cargo handling apparatus 10 detects a loading state within the accumulating portion 110 using a sensor such as the second sensor 41, the LRF 44, etc., operates to lift the second conveyor portion 42 to an appropriate conveyor level, scoops up an article on the conveyor with the gripping portion 46, and conveys the article 101 and unloads it at a planned loading position. Such a series of detection operation, vertically moving operation, gripping operation, and carrying operation achieves the increased speed of cargo handling, in particular, loading, which is performed by the cargo handling apparatus 10.

For example, a conventional cargo handling apparatus, in particular, a loading apparatus, handles designated cargo by learning, and is not suitable for loading articles in irregular shapes. In contrast, the cargo handling apparatus 10 according to the present embodiment can efficiently load various articles in irregular shapes.

A modification of the first embodiment will be described.

In a modification, the individual article-processing portion 20 detects, using the first sensor 24, a label that is attached to each of the articles 101 and contains an address or the like. The label detection information on the article 101 by the first sensor 24 is acquired by the recognition portion 86. The mechanism control portion 88 controls the operation of the attitude changing conveyor 25 based on the label detection information that the recognition portion 86 acquires. For example, the mechanism control portion 88 performs vertical/horizontal conversion, rolling, or top/bottom conversion on the articles 101 by an attitude changing portion provided in the attitude changing conveyor 25 in such a manner that the orientations of the labels are aligned.

According to the present modification, the attitude changing conveyor 25 performs attitude changing on the articles 101 to align the orientations of their labels, so that the article group 102 in the accumulating portion 110 can be aligned in terms of orientation of the labels.

Hereinafter, second and third embodiments will be described.

The following omits descriptions for similar configurations and operations to those of the cargo handling system 1 described in connection with the first embodiment. In addition, in the following description and FIGS. 16 to 20, components denoted by the same reference numerals as those of the cargo handling system 1 according to the first embodiment may be understood as having similar configurations and as performing similar operations as those of the first embodiment.

Figure 16:
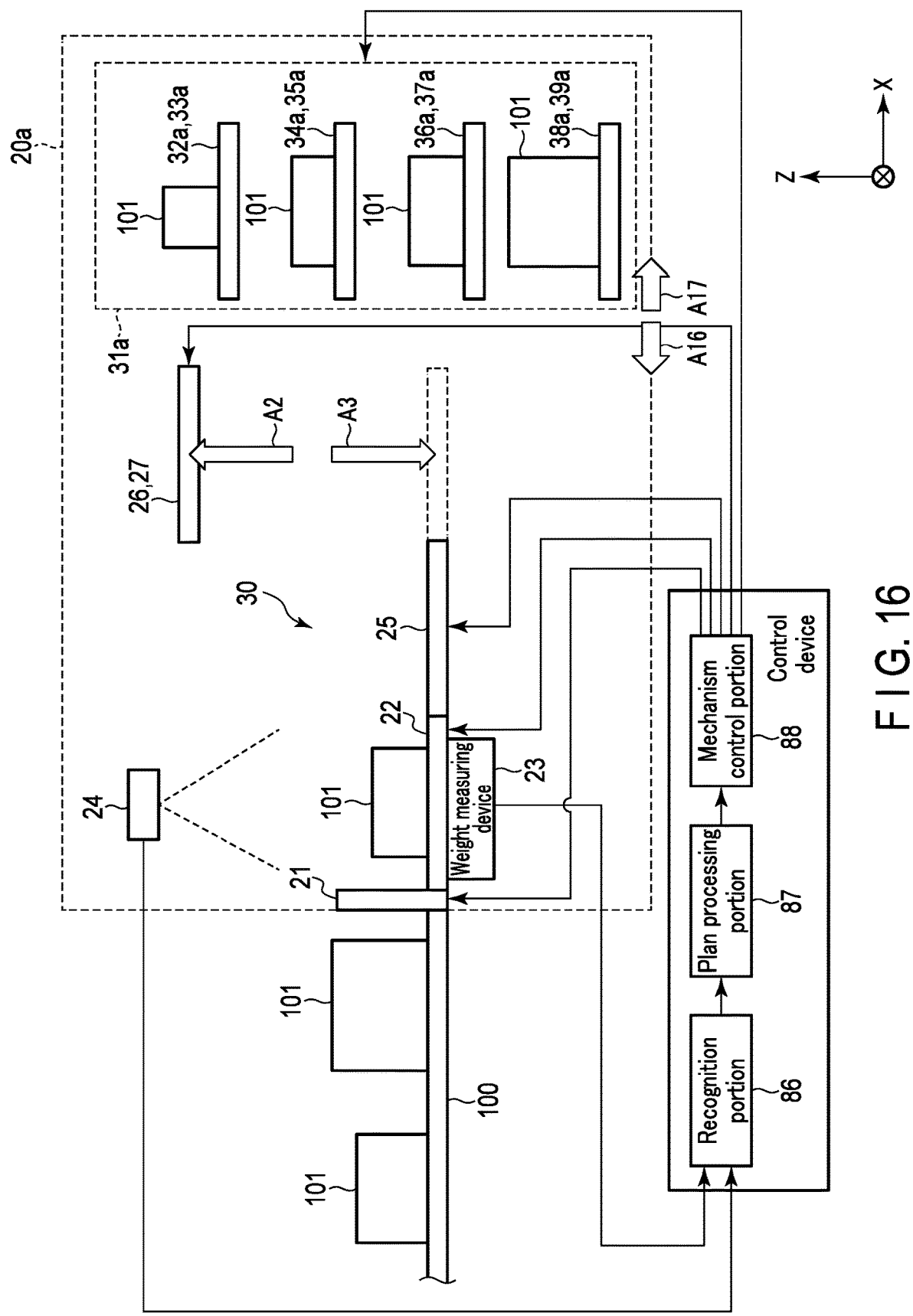
FIG. 16 is a diagram schematically illustrating an example of a configuration on a periphery of an individual article-processing portion of a cargo handling apparatus according to a second embodiment.

An individual article-processing portion 20a in a cargo handling apparatus according to the second embodiment will be described with reference to FIG. 16.

In the second embodiment, the individual article-processing portion 20a has a buffer portion 31a arranged adjacent to the vertically moving/phase-changing conveyor 26. The buffer portion 31a causes one or more articles 101 to stand by on the downstream side of the individual article-processing portion 20 before they are conveyed from the first conveyor portion 30 of the individual article-processing portion 20 to the second conveyor portion 42 of the body core portion 40. In other words, the buffer portion 31a receives the articles 101 conveyed through the first conveyor portion 30, and causes the received articles 101 to temporarily stand by before conveying them to the second conveyor portion 42.

The buffer portion 31a has one or more conveyors and a conveyor moving mechanism for replacing, vertically moving, and phase-changing these conveyors. In FIG. 16, the buffer portion 31a is provided with four conveyors 32a, 34a, 36a, and 38a, and conveyor moving mechanisms 33a, 35a, 37a, and 39a respectively corresponding to these conveyors. Each of the conveyors 32a, 34a, 36a, 38a is replaceable with a vertically moving/phase-changing conveyor 26 or any of the other conveyors 32a, 34a, 36a, and 38a, as indicated by arrows A16 and A17 in FIG. 16. The number of conveyors and conveyor moving mechanisms included in the buffer portion 31a is not limited the above and may be any number. The operation of each part of the buffer portion 31a is controlled by the mechanism control portion 88.

In the second embodiment, for example, the information of the weight measured by the weight measuring device 23 and the detection information detected by the first sensor 24 are acquired by the recognition portion 86 of the control device 80. The recognition portion 86 calculates the size of the article 101 on the receiving conveyor 22 based on the detection information by the first sensor 24. The article information including the size and weight of the article 101 acquired by the recognition portion 86 is acquired by the plan processing portion 87. The article corresponding to this article information is sent to one of the conveyors of the buffer portion 31a, thereby being stored in the buffer portion 31a. The plan processing portion 87 plans an optimum loading order with respect to the accumulating portion 110 based on the acquired article information. The plan processing portion 87 determines a loading plan based on the article information on articles stored in the buffer portion 31a, and based on this determination, the articles 101 are conveyed to the second conveyor portion 42 of the body core portion 40.

As described above, in the cargo handling apparatus according to the second embodiment, the individual article-processing portion 20 is provided with the buffer portion 31a having a buffering function. The plan processing portion 87 plans an optimum loading order within a buffer capacity of the buffer portion 31a (such as the number of conveyors included in the buffer portion 31a), and according to this order, articles are conveyed to the body core portion 40 and are loaded from the body core portion 40 to the accumulating portion 110 in the accumulated article-processing portion 60.

In the first embodiment, the cargo handling apparatus 10 loads the articles 101 onto the accumulating portion 110 in accordance with the order of conveyance from the conveyor 100 in such a manner that the filling rate is as high as possible. On the other hand, according to the second embodiment, loading can be performed based on a plan that is more optimum than loading according to the conveyance order by temporarily arranging the articles 101, which have been conveyed through the receiving conveyor 22 and the attitude changing conveyor 25, in the buffer portion 31a within the individual article-processing portion 20.

Figure 17:
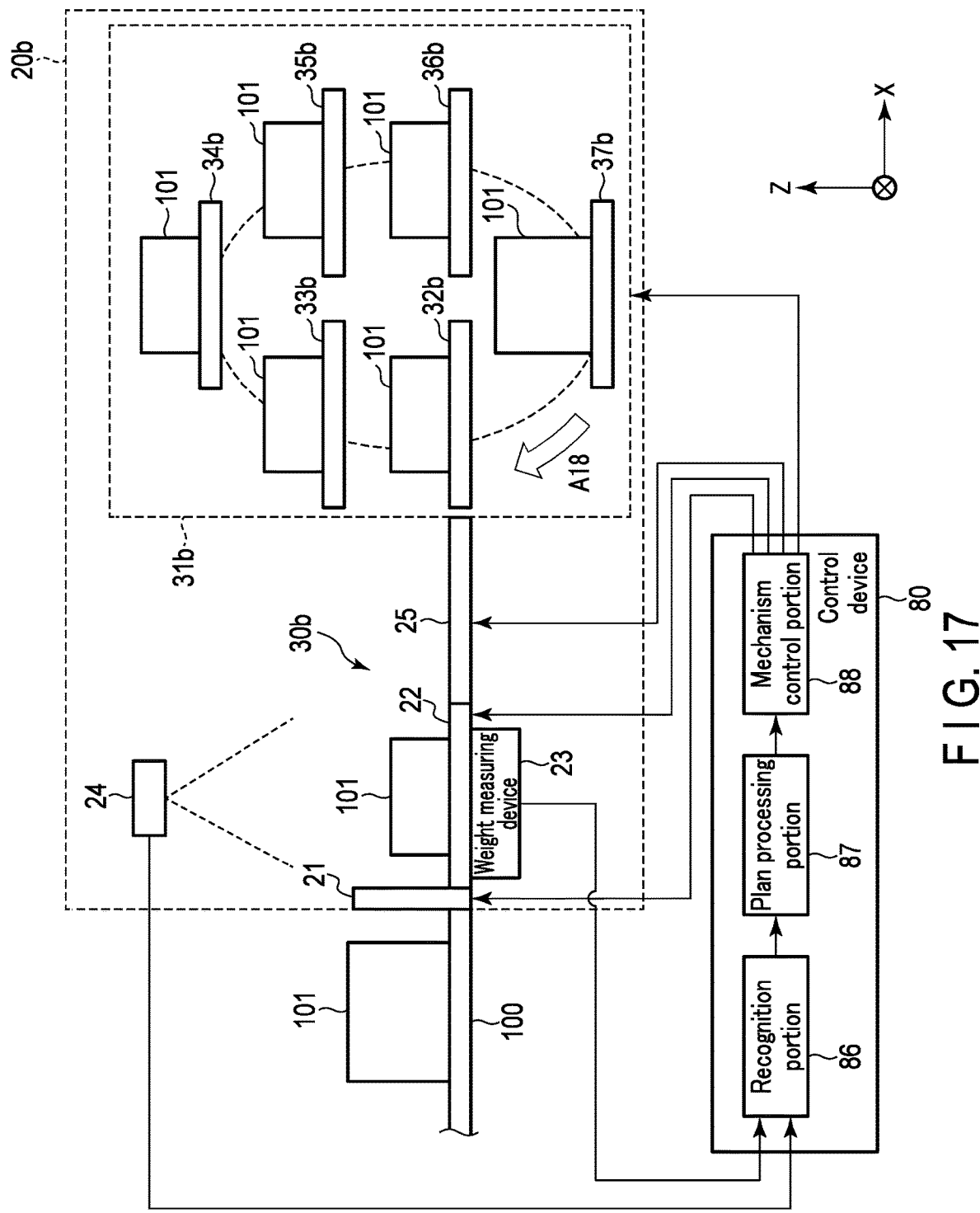
FIG. 17 is a diagram schematically illustrating an example of a configuration on a periphery of an individual article-processing portion of a cargo handling apparatus according to a third embodiment.

An individual article-processing portion 20b in the cargo handling apparatus according to the third embodiment will be described with reference to FIG. 17.

In the third embodiment, the individual article-processing portion 20b is not provided with the vertically moving/phase-changing conveyor 26 and the conveyor moving mechanism 27. The individual article-processing portion 20b includes a buffer portion 31b as in the second embodiment. The buffer portion 31b in the third embodiment is a rotary buffer portion of a multi-story parking structure. In FIG. 17, the buffer portion 31b is provided with six conveyors 32b, 33b, 34b, 35b, 36b, and 37b and a conveyor moving mechanism (not shown) for rotating these conveyors, for example, in a direction indicated by arrow A18. The operation of each part of the buffer portion 31b is controlled by the mechanism control portion 88. The buffer portion 31b is, for example, a buffering rotary tower that is rotating clockwise at a constant speed.

In the present embodiment, the article 101 is conveyed to any one of the conveyors 32b, 33b, 34b, 35b, 36b, and 37b of the buffer portion 31b through the attitude changing conveyor 25. Thereafter, the article 101 is directly conveyed from any of the conveyors 32b, 33b, 34b, 35b, 36b, and 37b of the buffer portion 31b to the second conveyor portion 42 of the body core portion 40. For example, each of the conveyors 32b, 33b, 34b, 35b, 36b, and 37b convey the article 101 thereon to the second conveyor portion 42 when being adjusted in level to the second conveyor portion 42. This makes it possible to shorten a takt time caused by, for example, interposing the buffer portion 31b between the vertically moving/phase-changing conveyor 26 and the second conveyor portion 42 in the second embodiment.

Also in the third embodiment, similarly to the second embodiment, the plan processing portion 87 determines a loading plan based on the article information on articles stored in the buffer portion 31b, and based on this determination, the articles 101 are conveyed to the second conveyor portion 42 of the body core portion 40. This enables loading to be performed based on a plan that is more optimum than loading according to the conveyance order.

Figure 19:
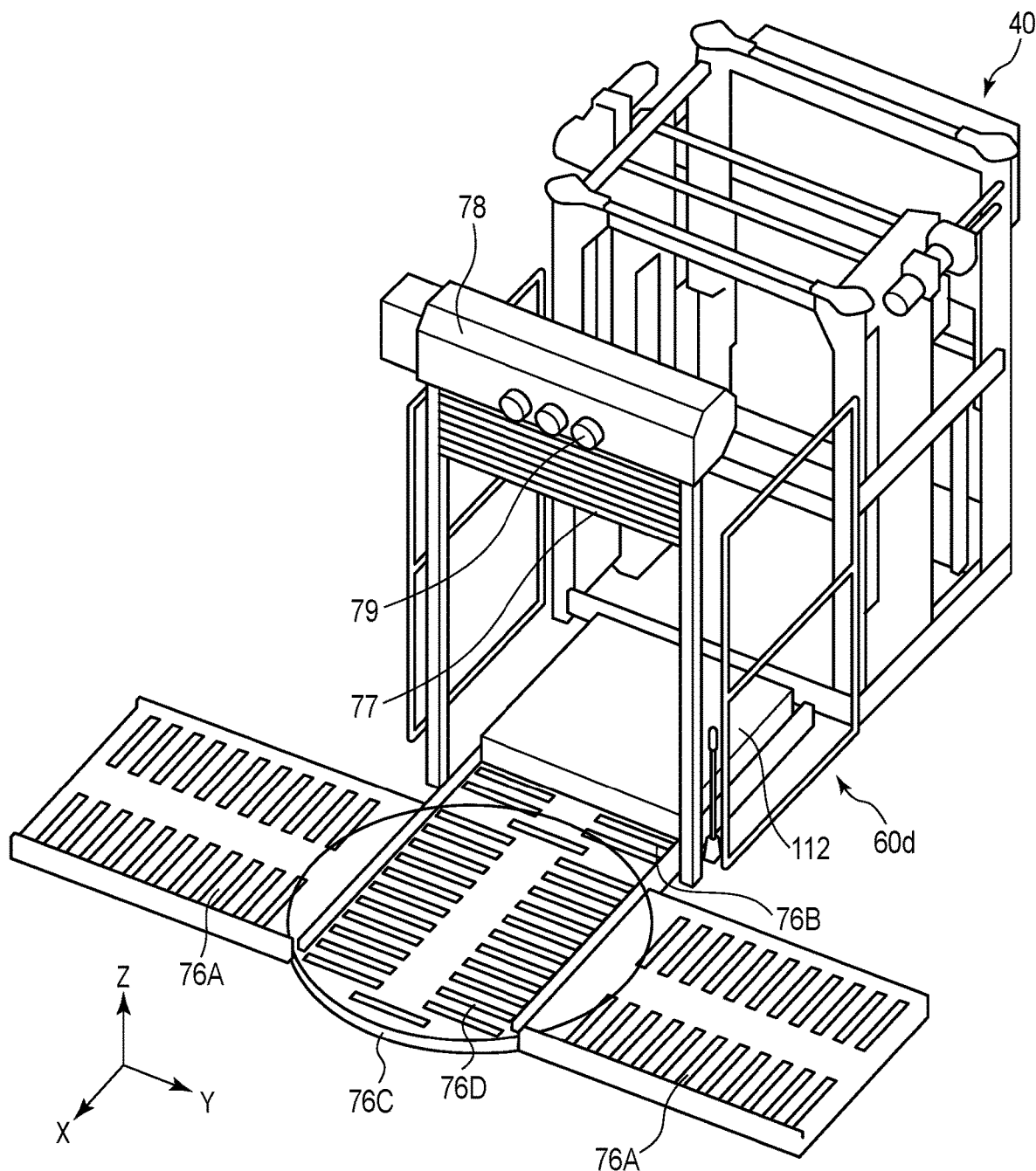
FIG. 19 is a perspective view illustrating an exemplary configuration on the periphery of the accumulated article-processing portion.
Figure 20:
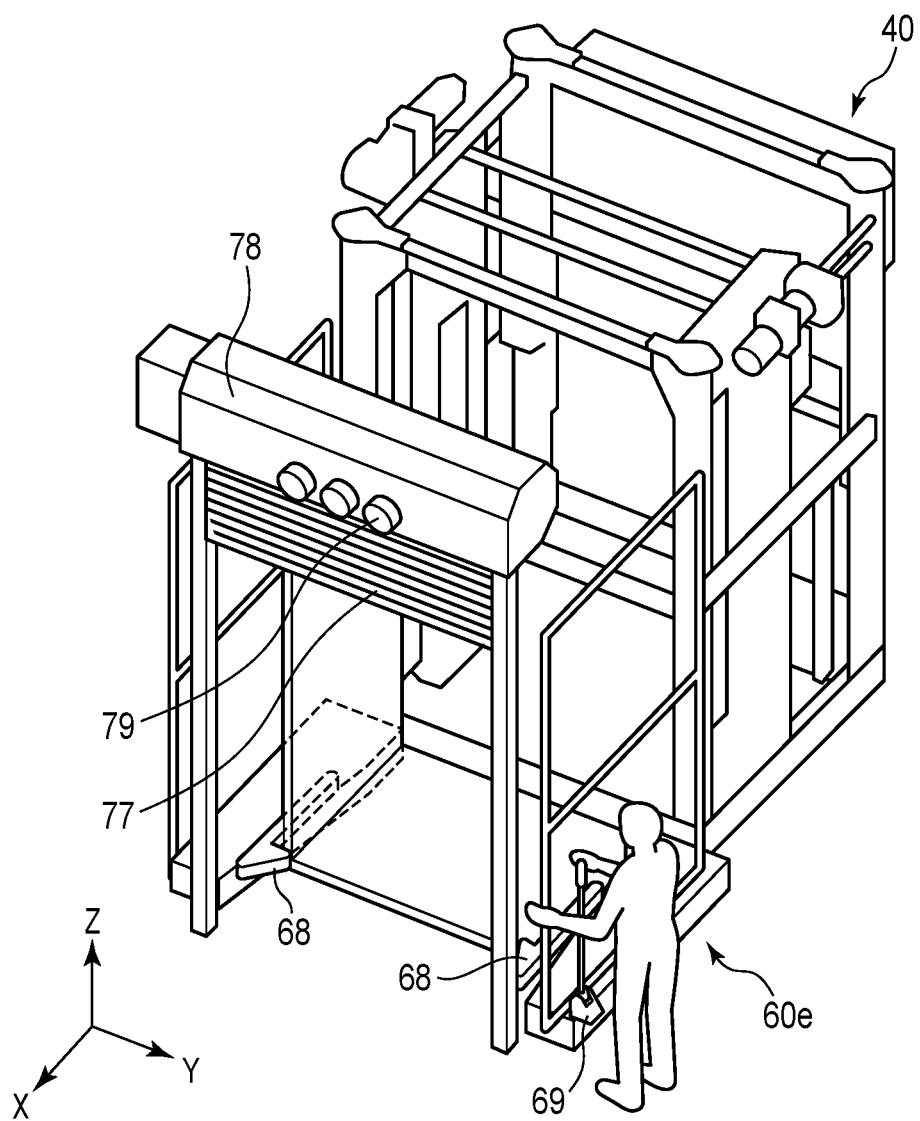
FIG. 20 is a perspective view illustrating an exemplary configuration on the periphery of the accumulated article-processing portion.

Hereinafter, various forms of the accumulated-article processing portion applicable to each embodiment will be described with reference to FIGS. 18 to 20. FIGS. 18 to 20 show the body core portion 40 and the accumulated-article processing portions 60c, 60d, and 60e; however, the body core portion 40 is simplified by showing only its outline, and the accumulated article-processing portion 60c, 60d, and 60e are also partially omitted.

FIGS. 18 to 20 illustrate examples of various forms of the accumulated-article processing portion. In the above, the RBP 111 to be moved by the operator 200's human power has been mainly described as the accumulating portion 110 onto which loading is performed; however, the accumulating portion 110 may be the flat pallet 112 to be carried by a fork lift. The accumulated article-processing portion 60 is applicable to the flat pallet 112, too.

For example, in FIG. 18, the accumulated article-processing portion 60c is provided with a flat pallet conveyance lane 76. The flat pallet conveyance lane 76 extends, for example, in the Y direction. The empty flat lane 112 is arranged on the flat pallet conveyance lane 76. The flat pallet 112 can be conveyed in the Y direction on the flat pallet conveyance lane 76.

In the accumulated article-processing portion 60c, at both ends of the flat pallet conveyance lane 76, shutters 77 which take the place of the safety door 71 are respectively arranged in the XZ plane on both ends of the flat pallet conveyance lane 76. Each of the shutters 77 can be automatically or manually stored in a shutter storage portion 78. Furthermore, the shutter storage portion 78 is provided with the indication lamp 79. The indication lamp 79 includes, for example, three lamps, i.e., a blue lamp, a yellow lamp, and a red lamp. By lighting or blinking of the lamps, the indication lamp 79 displays various types of information such as whether or not loading or unloading is possible, work being performed, and stoppage due to an error. Although not illustrated, a side face (YZ plane) of the accumulated article-processing portion 60c on a side different from the body core portion 40 is covered with a safety fence.

For example, in FIG. 19, the accumulated article-processing portion 60d is provided with two first conveyance lanes 76A, a second conveyance lane 76B, and a turntable 76D including a third conveyance lane 76C. The first conveyance lane 76A extends, for example, in the Y direction. The second conveyance lane 76B extends, for example, in the X direction. The third conveyance lane 76C is arranged between the first conveyance lanes 76A. The third conveyance lane 76C is arranged adjacent to the second conveyance lane 76B. The third conveyance lane 76C can switch the conveyance direction between, for example, the X direction and the Y direction by the rotation of the turntable 76D. By the rotation of the turntable 76D, the third conveyance lane 76C aligns in terms of conveyance direction with the first conveyance lane 76A or with the second conveyance lane 76B. The empty flat pallet 112 is arranged on the second conveyance lane 76B.

In the accumulated article-processing portion 60d, a shutter 77 which takes the place of the safety door 71 is arranged in the YZ plane between the second conveyance lane 76B and the third conveyance lane 76C. The shutter 77 can be automatically or manually stored in the shutter storage portion 78. Further, the shutter storage portion 78 is provided with the indication lamp 79. Although not illustrated, both side faces (XZ plane) of the accumulated article-processing portion 60d are covered with a safety fence.

For example, the accumulated article-processing portion 60e shown in FIG. 20 is a type in which the RBP 111 is installed, and is a front switch-back type. The setting mechanism 68 and the operation lever 69 such as those described for the first embodiment are illustrated. The accumulated article-processing portion 60e of this type may also be provided, instead of the safety door 71, with the shutter 77, the shutter storage portion 78, and the indication lamp 79. Although not illustrated, both side faces (XZ plane) of the accumulated article-processing portion 60e are covered with a safety fence.

While certain embodiments have been described, these embodiments have been presented by way of example only, and are not intended to limit the scope of the inventions. These novel embodiments may be embodied in various forms, and various omissions, replacements, and changes can be made thereon without departing from the spirit of the invention. The embodiments and their modifications are included in the scope and spirit of the invention and are included in the scope of the claimed inventions and their equivalents.

What is claimed is:

1. A cargo handling apparatus, comprising:
    a first conveyor portion configured to convey an article to be handled in a first direction;
    a first detection portion configured to detect article information relating to the article conveyed through the first conveyor portion;
    a second conveyor portion configured to receive the article conveyed through the first conveyor portion and convey the article in a second direction intersecting the first direction;
    a gripping portion configured to grip the article on the second conveyor portion to move the article in a third direction intersecting the second direction and arrange the article in an accumulating portion;
    a second detection portion configured to detect stacking information indicating an arrangement state of articles in the accumulating portion; and
    a controller configured to control operation of the gripping portion based on the article information and the stacking information, wherein
    the gripping portion includes:
        a comb-tooth shaped member configured to scoop up the article on the second conveyor portion; and
        a suction portion configured to suck the article,
    the second conveyor portion includes a roller conveyor constituted by a plurality of rollers, and
    the comb-tooth shaped member is arranged in such a manner as to be vertically movable between the plurality of rollers.

2. The cargo handling apparatus according to claim 1, wherein
    the first conveyor portion includes a first transfer conveyor configured to transfer the article to the second conveyor portion, and
    the first transfer conveyor includes a transfer conveyor—vertically moving mechanism configured to vertically move the first transfer conveyor in order to adjust a level of the first transfer conveyor to a level of the second conveyor portion.

3. The cargo handling apparatus according to claim 1, wherein the first conveyor portion includes a direction-changing conveyor configured to reverse a conveyance direction of the article from the first direction in such a manner that the article is receivable by the second conveyor portion.

4. The cargo handling apparatus according to claim 1, further comprising a buffer portion configured to receive the article conveyed through the first conveyor portion and to cause the article to temporarily stand by before the article is conveyed to the second conveyor portion.

5. The cargo handling apparatus according to claim 1, wherein the first conveyor portion includes an attitude changing portion configured to change an attitude of the article.

6. The cargo handling apparatus according to claim 1, wherein
    the second conveyor portion includes a second conveyor configured to receive the article from the first conveyor portion, and
    the second conveyor includes a transfer conveyor—vertically moving mechanism configured to vertically move the second conveyor in order to adjust a level of the second conveyor to a level that is taken at a time when the article is arranged in the accumulating portion.

7. The cargo handling apparatus according to claim 1, further comprising a positioning mechanism configured to adjust a position of the article in the second direction within the second conveyor portion.

8. The cargo handling apparatus according to claim 1, further comprising a movable flap mechanism configured to support the article on the second conveyor portion in a case where the article is gripped with the gripping portion within the second conveyor portion.

9. The camo handling apparatus according to claim 1, wherein the accumulating portion is movable and includes a locking mechanism configured to lock the accumulating portion in a case where the accumulating portion is arranged.

10. The cargo handling apparatus according to claim 9, comprising:
    a safety fence configured to surround the arranged accumulating portion; and
    a safety door configured to open and close a part of the safety fence.

11. The cargo handling apparatus according to claim 8, wherein
    the movable flap mechanism stands upright by means of a spring, and
    the movable flap mechanism falls down with respect to the second conveyor when the movable flap mechanism is pressed by the article.

12. The cargo handling apparatus according to claim 1, wherein
    the comb-tooth shaped member comprises a first comb-tooth shaped member and a second comb-tooth shaped member,
    the plurality of rollers comprise a first roller, a second roller, and a third roller,
    the first comb-tooth shaped member is arranged in such a manner as to be vertically movable between the first roller and the second roller, and
    the second comb-tooth shaped member is arranged in such a manner as to be vertically movable between the second roller and the third roller.

* * * * *